(12) United States Patent
Tseng

(10) Patent No.: US 11,525,977 B2
(45) Date of Patent: Dec. 13, 2022

(54) IMAGING APPARATUS AND METHOD FOR ASSEMBLING THE SAME

(71) Applicant: LUXVISIONS INNOVATION LIMITED, New Territories (HK)

(72) Inventor: Cheng-Te Tseng, New Territories (HK)

(73) Assignee: GUANGZHOU LUXVISIONS INNOVATION TECHNOLOGY LIMITED, Science City (CN)

( * ) Notice: Subject to any disclaimer, the term of this patent is extended or adjusted under 35 U.S.C. 154(b) by 0 days.

(21) Appl. No.: 17/244,380

(22) Filed: Apr. 29, 2021

(65) Prior Publication Data

US 2021/0247622 A1 Aug. 12, 2021

Related U.S. Application Data

(60) Provisional application No. 63/023,955, filed on May 13, 2020.

(30) Foreign Application Priority Data

Nov. 25, 2020 (CN) .......................... 202011338024.X

(51) Int. Cl.
| | | |
|---|---|---|
| *G03B 5/02* | (2021.01) | |
| *G02B 27/64* | (2006.01) | |
| *G02B 7/04* | (2021.01) | |
| *G03B 5/00* | (2021.01) | |
| *G03B 13/32* | (2021.01) | |
| *H04N 5/225* | (2006.01) | |
| *H04N 5/232* | (2006.01) | |
| *H02K 41/035* | (2006.01) | |

(52) U.S. Cl.
CPC ............. *G02B 7/04* (2013.01); *G02B 27/646* (2013.01); *G03B 5/00* (2013.01); *G03B 5/02* (2013.01); *G03B 13/32* (2013.01); *H04N 5/2253* (2013.01); *H04N 5/2254* (2013.01); *H04N 5/23287* (2013.01); *G03B 2205/0007* (2013.01); *G03B 2205/0069* (2013.01); *H02K 41/0356* (2013.01)

(58) Field of Classification Search
CPC .......................... G02B 7/04; G03B 5/00–5/02
See application file for complete search history.

(56) References Cited

U.S. PATENT DOCUMENTS

| 10,616,452 | B2 | 4/2020 | Topliss et al. | |
| 11,261,081 | B2 * | 3/2022 | Ng | ........................ B81B 3/0062 |
| 2022/0053111 | A1 * | 2/2022 | Sommer | .............. H04N 5/2253 |

FOREIGN PATENT DOCUMENTS

| CN | 107077044 B | 1/2020 | | |
| WO | WO-2016009200 A1 * | 1/2016 | ............. | F03G 7/065 |

* cited by examiner

*Primary Examiner* — Minh Q Phan
(74) *Attorney, Agent, or Firm* — Birch, Stewart, Kolasch & Birch, LLP

(57) ABSTRACT

An imaging apparatus includes an image sensor assembly and a plurality of signal feed-in contacts. The image sensor assembly includes a movable substrate, an image sensing chip, and a bearing frame. The image sensing chip is disposed on an upper surface of the movable substrate. The bearing frame is disposed on the upper surface and surrounds the image sensing chip. The signal feed-in contacts are disposed on the movable substrate, and the signal feed-in contacts are not shaded by the image sensor assembly. The signal feed-in contacts are configured to transmit an enabling signal for enabling the image sensing chip.

13 Claims, 24 Drawing Sheets

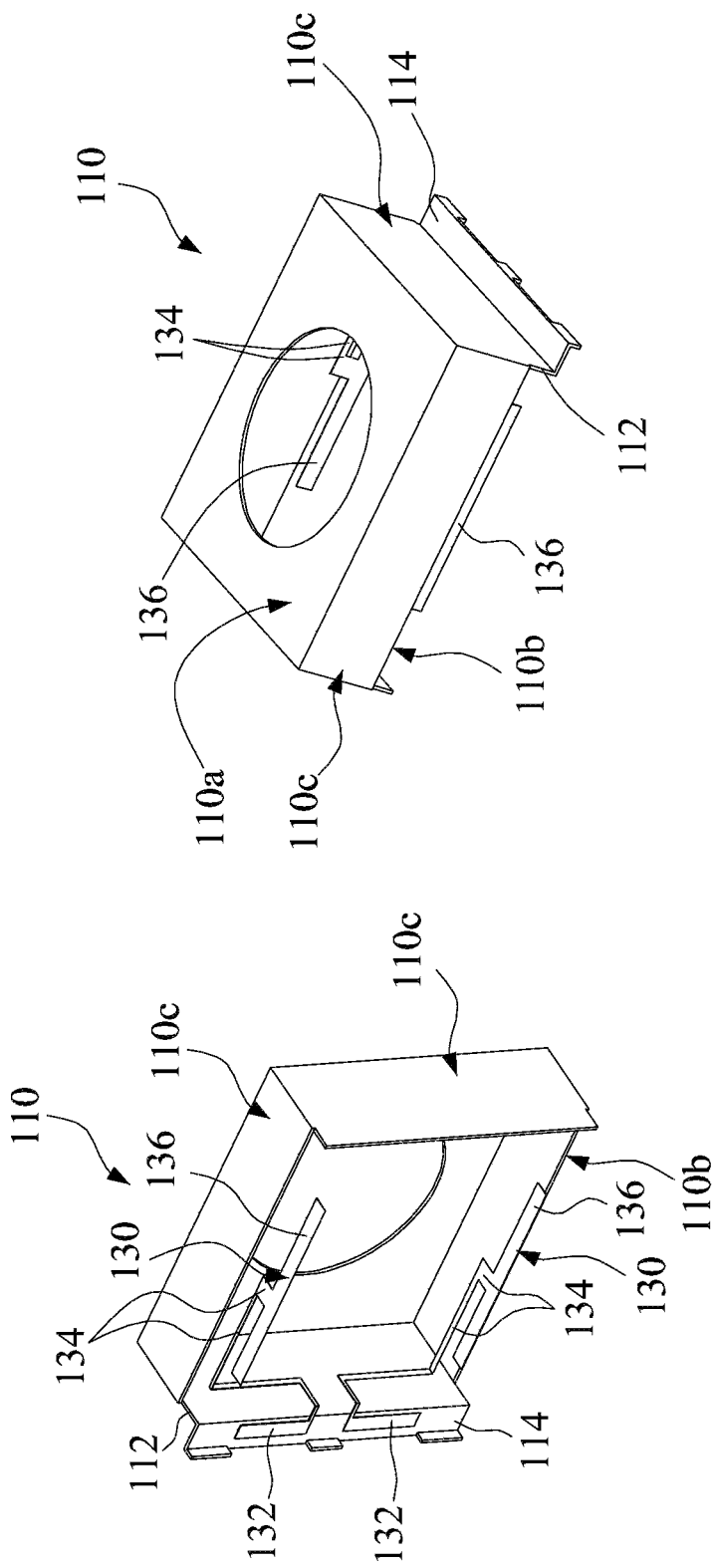

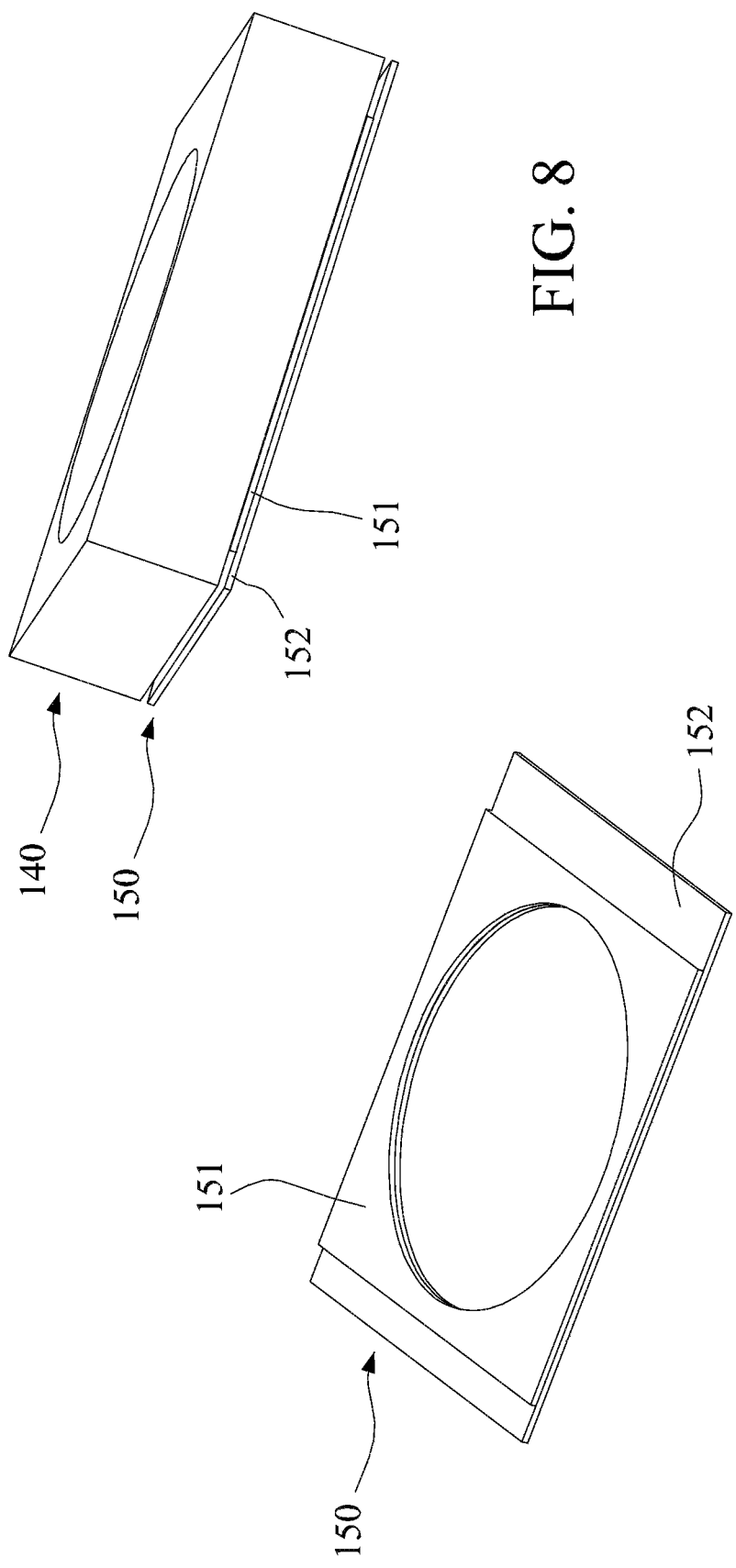

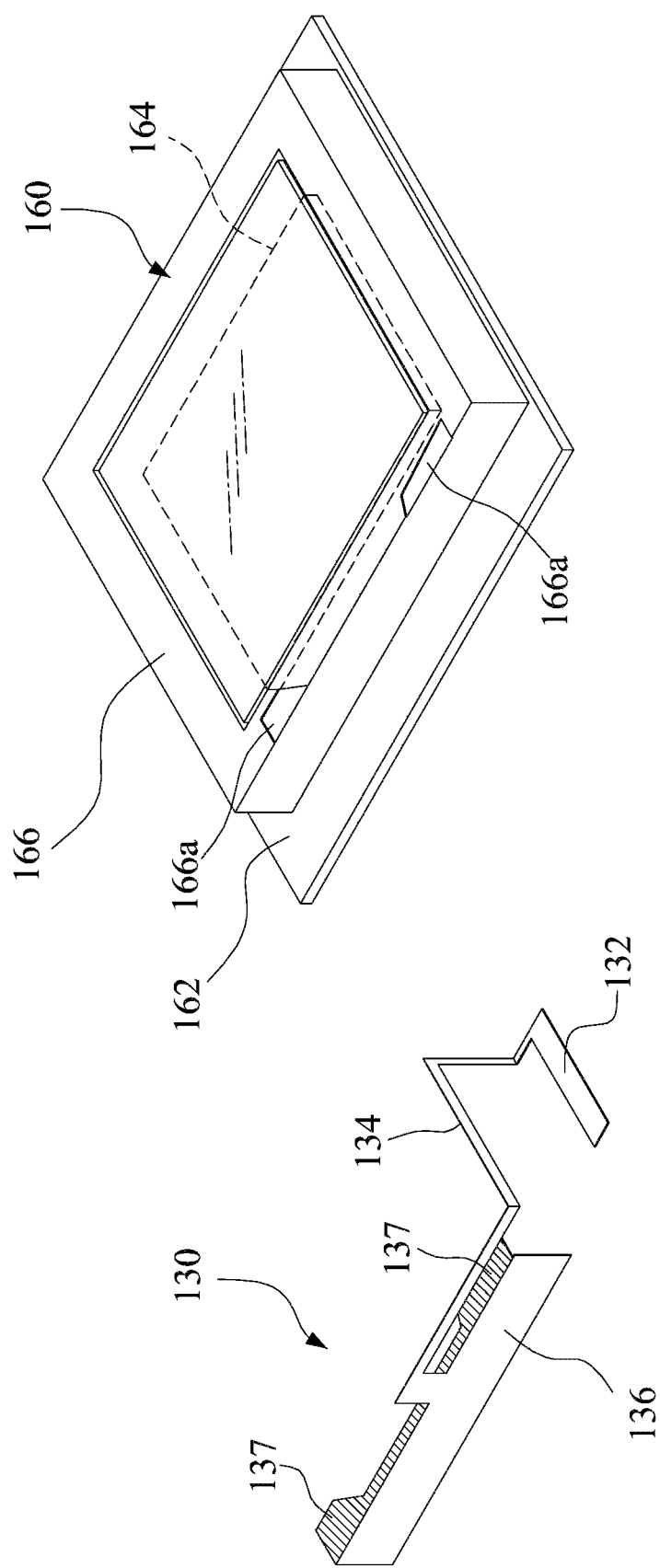

IMAGING APPARATUS AND METHOD FOR ASSEMBLING THE SAME

CROSS-REFERENCES TO RELATED APPLICATIONS

This application claims the benefit of U.S. provisional application Ser. No. 63/023,955, filed on May 13, 2020 and claims the priority of Patent Application No. 202011338024.X filed in China, P.R.C. on Nov. 25, 2020. The entirety of the above-mentioned patent applications are hereby incorporated by references herein and made a part of the specification.

BACKGROUND

Technical Field

This disclosure relates to optical imaging, and in particular relates to an imaging apparatus.

Related Art

The assembly method of a sensor shift optical image stabilization (Sensor Shift OIS) lens module in the art includes: soldering a FPC cable (Flexible Printed Circuit cable) horizontally on an image sensor substrate, then assembling an image sensor assembly, an optical image stabilization actuator and a lens assembly in sequence, and finally, performing packaging with a case.

The FPC cable is bent into an appropriate shape in advance, and the FPC cable soldering terminals at one end are partially bent in a horizontal manner and soldered horizontally to the image sensor substrate. The image sensor assembly and the lens assembly are assembled on the image sensor substrate from top to bottom, finally packaging is performed with a case, and the lens assembly is fixed with the case. The image sensor substrate can be driven by the optical image stabilization actuator to horizontally move with respect to the lens assembly to achieve the optical image stabilization function.

However, the FPC cable is not sufficiently rigid to maintain its shape. When components are placed down and assembled, the FPC cable is likely to swing and affect the assembly, the horizontally bent part is likely to touch other components and cannot be placed successfully, and soldering failure is likely to be caused.

SUMMARY

In view of the foregoing problem, this disclosure provides an imaging apparatus and a method for assembling the same, so as to improve the fixation of the flexible flat cable.

One or more embodiments of this disclosure provide an imaging apparatus, including an image sensor assembly and a plurality of signal feed-in contacts. The image sensor assembly at least includes a movable substrate, an image sensing chip, a bearing frame, and a signal feed-in part extending from an edge of the movable substrate. The image sensing chip is disposed on an upper surface or the movable substrate. The bearing frame is disposed on the upper surface and surrounds the image sensing chip. A plurality of signal feed-in contacts are disposed on the signal feed-in part, and the vertical projections of the signal feed-in contacts and the bearing frame do not overlap. The signal feed-in contacts are configured to transmit an enabling signal for enabling the image sensing chip.

One or more embodiments of this disclosure further provide a method for assembling an imaging apparatus, including:

Providing an image sensor assembly; wherein the image sensor assembly at least includes a movable substrate, an image sensing chip, a bearing frame, and a signal feed-in part extending from an edge of the movable substrate; the image sensing chip is disposed on an upper surface or the movable substrate; the bearing frame is disposed on the upper surface and surrounds the image sensing chip Disposing a plurality of signal feed-in contacts on the signal feed-in part; wherein the vertical projections of the signal feed-in contacts and the bearing frame do not overlap, and the signal feed-in contacts are configured to transmit an enabling signal for enabling the image sensing chip;

Disposing a lens assembly above the image sensor assembly;

Transmitting the enabling signal to the image sensing chip to light up the image sensing chip;

According to at least one test image generated by the image sensing chip, adjusting a relative position between the lens assembly, an optical axis of the lens assembly, and the image sensing chip, to correct the optical axis; and Connecting the image sensor assembly to the lens assembly.

In one or more embodiments of this disclosure, the electrical connection end is disposed perpendicular to the upper surface of the movable substrate and to be directly electrically connected to the circuit of the movable substrate. Therefore, the process of installing the flexible flat cable can avoid contacting other components. In one or more embodiments, the flexible flat cable is combined with the fixing frame or a bearing frame of the image sensor assembly in advance to facilitate installation of the flexible flat cable. In one or more embodiments of this disclosure, a plurality of signal feed-in contacts are further disposed on the movable substrate of the image sensor assembly, thereby facilitating lighting up of the image sensing chip in the assembly process, and facilitating an active alignment process.

BRIEF DESCRIPTION OF THE DRAWINGS

This disclosure will become more fully understood from the detailed description given herein below for illustration only, and thus not limitative of this disclosure, wherein:

FIG. 4 is a perspective view of a fixing frame and a flexible flat cable in the first embodiment of this disclosure.

FIG. 5 is another perspective view of the fixing frame and the flexible flat cable in the first embodiment of this disclosure.

FIG. 7 is a perspective view of an optical image stabilization actuator in the first embodiment of this disclosure.

FIG. 8 is a perspective view of the optical image stabilization actuator and a lens assembly in the first embodiment of this disclosure.

FIG. 28 is a perspective view of a flexible flat cable in a sixth embodiment of this disclosure.

FIG. 29 is a perspective view of an image sensor assembly in the sixth embodiment of this disclosure.

DETAILED DESCRIPTION

Figure 1:
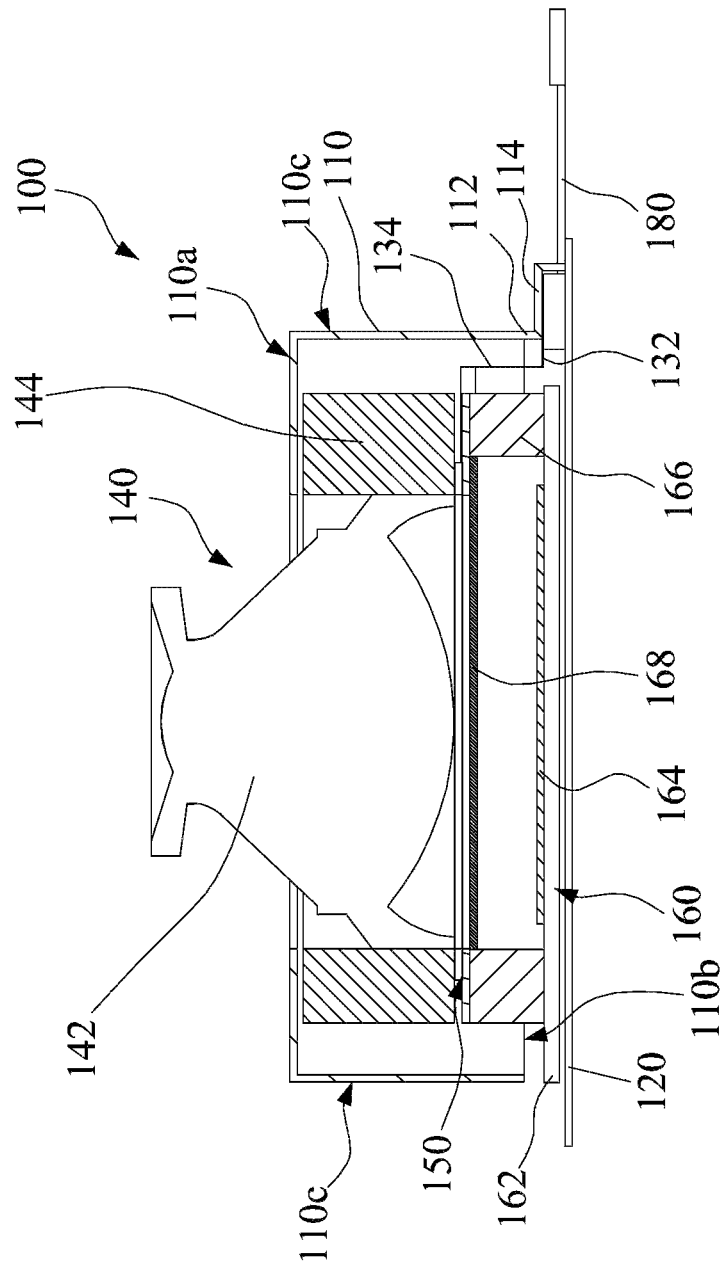
FIG. 1 is a cross-sectional view of an imaging apparatus in a first embodiment of this disclosure.
Figure 2:
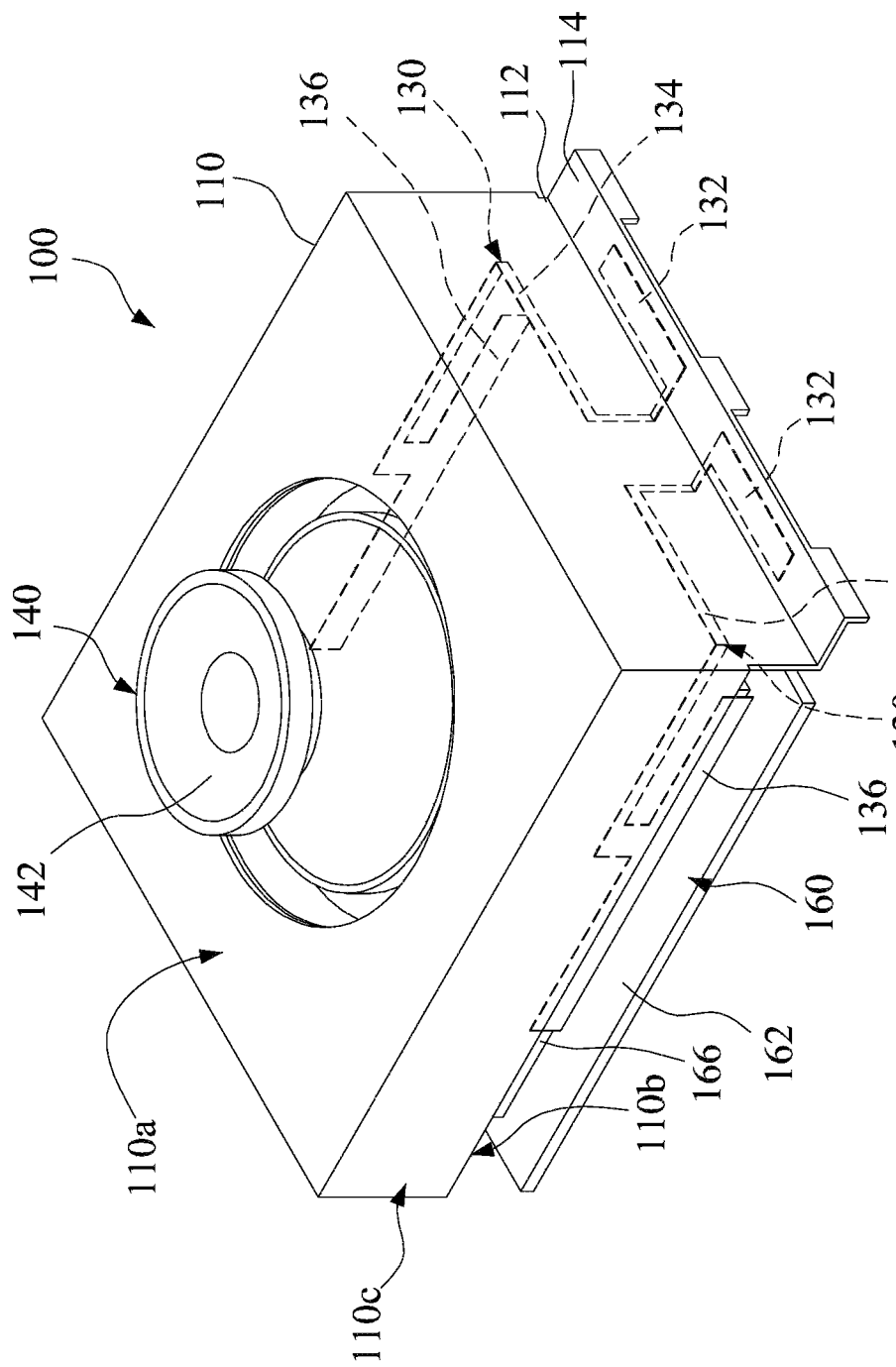
FIG. 2 is a perspective view of the imaging apparatus in the first embodiment of this disclosure.
Figure 3:
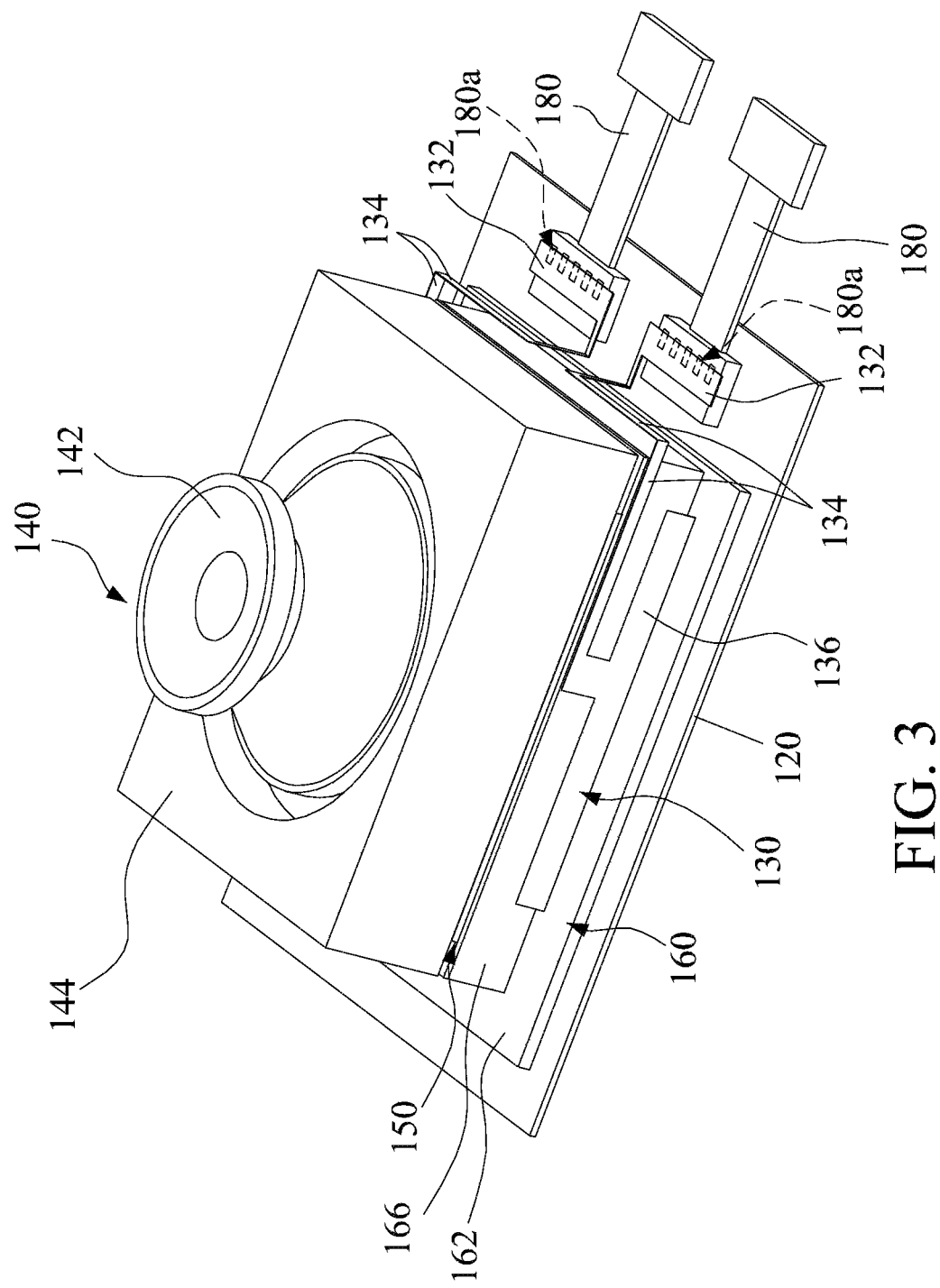
FIG. 3 is a perspective view of part of components of the imaging apparatus in the first embodiment of this disclosure.

FIG. 1, FIG. 2 and FIG. 3 show an imaging apparatus 100 disclosed in a first embodiment of this disclosure, configured to be disposed in electronic devices. The electronic devices include, but are not limited to, smart phones, tablet computers, notebook computers, displays, stand-alone cameras, and aerial cameras.

As shown in FIG. 1, FIG. 2 and FIG. 3, the imaging apparatus 100 includes a fixing frame 110, a base 120, one or more flexible flat cables 130, a lens assembly 140, an optical image stabilization actuator 150 and an image sensor assembly 160.

As shown in FIG. 4 and FIG. 5, the fixing frame 110 includes a top surface side 110a, a bottom surface side 110b, and a lateral side wall 110c. The top surface side 110a and the bottom surface side 110b are communicated, and an accommodating space is formed between the top surface side 110a and the bottom surface side 110b. The lateral side wall 110c connects the top surface side 110a and the bottom surface side 110b and surrounds the accommodating space. The imaging apparatus 100 further includes an extension portion 112 and a fixing portion 114. The extension portion 112 extends from a part of the edge of the bottom surface side 110b. The fixing portion 114 is connected to the extension portion 112 such that the fixing portion 114 is indirectly disposed on the fixing frame 110, the fixing portion 114 is substantially parallel to the bottom surface side 110b, and a height difference exists between the fixing portion 114 and the bottom surface side 110b. In different embodiments, the extension portion 112 and the fixing portion 114 are integrally formed on the fixing frame 110. In different embodiments, the height difference may also be omitted, and the extension portion 112 is also omitted, so that the fixing portion 114 is directly connected to or extended from an edge of the bottom surface side 110b. In different embodiments, the fixing portion 114 is directly connected to or extended from any part of the fixing frame 110, and is not limited to be directly connected to or extended from the edge of the top surface side 110a or the bottom surface side 110b. In different embodiments, the top surface side 110a of the fixing frame 110 described above may also be changed to a lateral surface side, and the lateral surface side and the bottom surface side 110b are communicated to form the accommodating space.

As shown in FIG. 1, the base 120 may be a board or a frame. In different embodiments, the base 120 may have a complicated structure to meet the assembly requirements of the imaging apparatus 100. In different embodiments, the base 120 may be a part of the housing of an electronic device. The fixing portion 114 is fixed to the base 120 such that a spacing distance is formed between the bottom surface side 110b of the fixing frame 110 and the base 120. The height difference between the fixing portion 114 and the bottom surface side 110b is mainly configured to form the spacing distance, so that the lateral side wall 110c of the fixing frame 110 and the base 120 are at least partially spaced. Therefore, the lateral surface of the image sensor assembly 160 and other components are partially exposed. It is not excluded that the fixing portion 114 is disposed in other positions, or the lateral surface side of the fixing frame 110 is directly provided with an opening, as long as the lateral surface of the image sensor assembly 160 and other components are partially exposed, to ensure that the image sensor assembly 160 has an enough actuation space when performing image stabilization compensation, and the flexible flat cable 130 and other components are exposed to perform electrical connection operations thereon (such as soldering or welding).

As shown in FIG. 1, FIG. 2 and FIG. 3, the lens assembly 140 is disposed in the accommodating space and fixed to the fixing frame 110. In a specific embodiment, the lens assembly 140 at least includes an optical lens set 142 and a focusing mechanism 144.

As shown in FIG. 1, the optical axis of the optical lens set 142 passes through the top surface side 110a and the bottom surface side 110b, so that the light incident surface of the optical lens set 142 corresponds to the top surface side 110*a*, and the light emitting surface of the optical lens set 142 corresponds to the bottom surface side 110*b*. In different embodiments, the top surface side 110*a* of the fixing frame 110 may be changed to a lateral surface side, and the lens assembly 140 further includes an optical path changing element. At the time, the light incident surface of the optical lens set 142 corresponds to the lateral surface side, and the light path changing element corresponds to the bottom surface side 110*b*. The light path changing element may be, but is not limited to, a prism or a reflector.

As shown in FIG. 1, the focusing mechanism 144 is connected to the optical lens set 142 and fixed to the fixing frame 110. The focusing mechanism 144 is usually arranged to surround the optical lens set 142 and includes actuators such as a voice coil motor, a piezoelectric component, or a shape memory alloy (SMA) member. The focusing mechanism 144 is configured to drive the optical lens set 142 to move along the optical axis for focusing.

Figure 6:
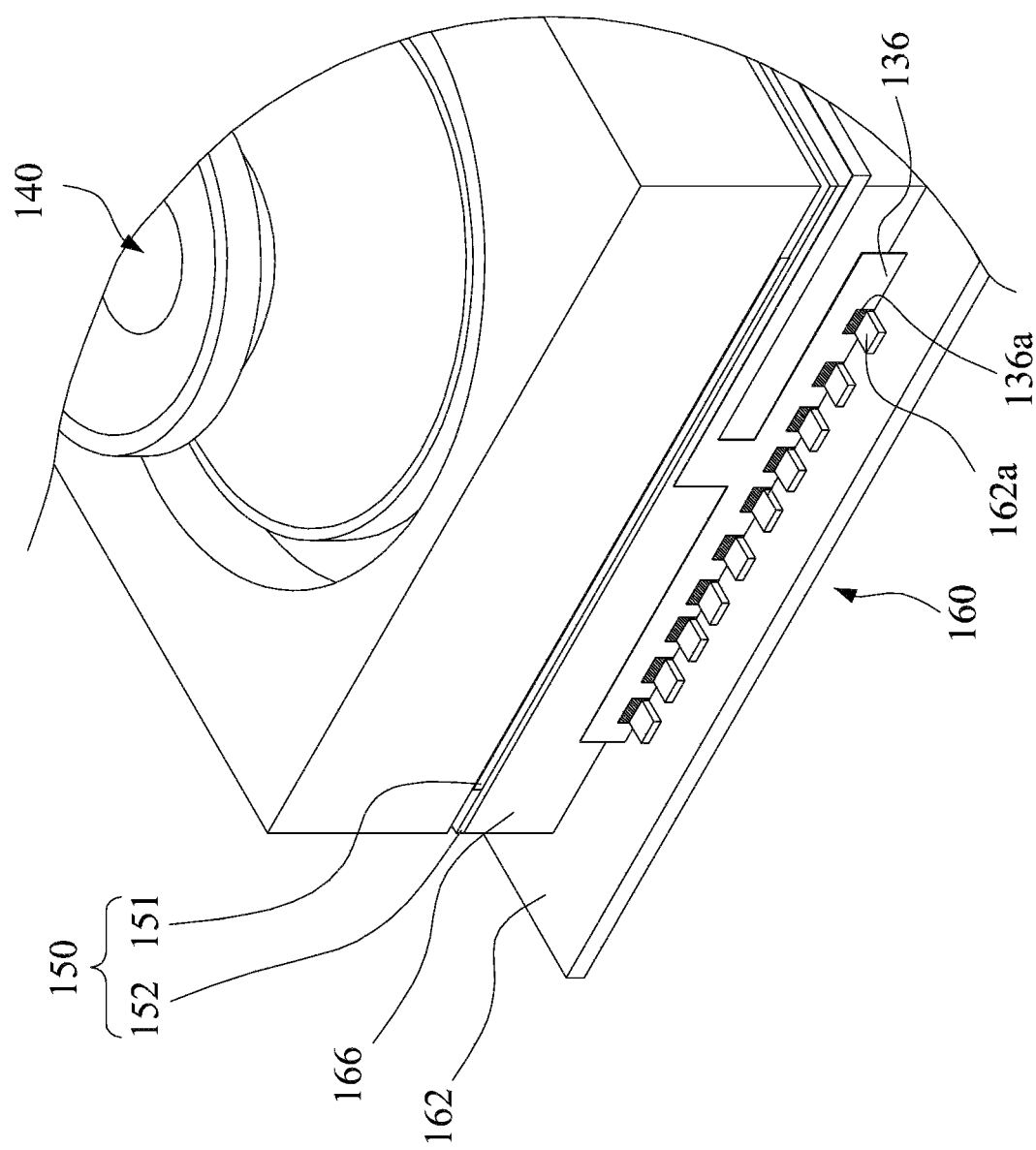
FIG. 6 is a partial perspective view of part of components in the first embodiment of this disclosure.

As shown in FIG. 1, FIG. 3, and FIG. 6, the image sensor assembly 160 is connected to the lens assembly 140 through the bottom surface side 110*b*. The image sensor assembly 160 includes a movable substrate 162, an image sensing chip 164, a bearing frame 166, and an optical glass plate 168. As shown in FIG. 6, an upper surface of the movable substrate 162 faces the bottom surface side 110*b*, and an upper surface of the movable substrate 162 is provided with a plurality of electrical connection pads 162*a*. The image sensing chip 164 is disposed on the upper surface of the movable substrate 162, and is electrically connected to the electrical connection pads 162*a* through wires. The bearing frame 166 is disposed on the upper surface of the movable substrate 162 and surrounds the image sensing chip 164. The optical glass plate 168 is disposed on the bearing frame 166 and corresponds to the image sensing chip 164. The movable substrate 162, the bearing frame 166, and the optical glass plate 168 define a closed space, and the image sensing chip 164 is located in the closed space to provide dust guard for the image sensing chip 164.

As shown in FIG. 1, FIG. 3, FIG. 6 and FIG. 7, the optical image stabilization actuator 150 connects the image sensor assembly 160 to the lens assembly 140.

As shown in FIG. 6, FIG. 7 and FIG. 8, the optical image stabilization actuator 150 includes an upper actuating member 151 and a lower actuating member 152. Through an adhesive or other fixing means the upper actuating member 151 is connected to the focusing mechanism 144, so that the upper actuating member 151 is connected to the lens assembly 140. The optical image stabilization actuator 150 also includes a hollow area, and the optical lens set 142 is disposed corresponding to the hollow area. The movable substrate 162 or the bearing frame 166 is connected to the lower actuating member 152 through an adhesive or other fixing means, so that the image sensor assembly 160 is connected to the lower actuating member 152 and maintains a spacing distance from the base 120. The lower actuating member 152 is configured to move with respect to the upper actuating member 151 on a plane perpendicular to the optical axis. Through the connection of the lower actuating member 152, the movable substrate 162 is disposed to float over the base 120 and may be driven by the lower actuating member 152. Therefore, the displacement of the lower actuating member 152 with respect to the upper actuating member 151 causes the image sensing chip 164 to move vertically with respect to the optical axis to achieve the optical image stabilization function.

In some embodiments, the optical image stabilization actuator 150 is not necessarily to be equipped with the upper actuating member 151 and the lower actuating member 152, and the optical image stabilization actuator 150 is disposed around the lens assembly 140 and the image sensor assembly 160, and is connected to the lens assembly 140 and/or the image sensor assembly 160 through a driving member to drive the lens assembly 140 and/or the image sensor assembly 160 to shift/rotate/tilt with respect to the optical axis to compensate for vibration. For example, the lens assembly 140 and the image sensor assembly 160 are assembled into one image sensing module, and the optical image stabilization actuator 150 is disposed on the base 120 or inside an electronic device and adjacent to the image sensing module, and drives the image sensing module to shift/rotate/tilt through a driving member to compensate for vibration. The driving member is, for example, a motor and a connecting rod. One end of the connecting rod is connected to the motor and the other end is connected to the lens assembly 140 and/or the image sensor assembly 160.

As shown in FIG. 2, FIG. 3, FIG. 4 and FIG. 5, the flexible flat cable 130 includes a fixed end 132, a floating section 134 and an electrical connection end 136. In the present embodiment, the flexible flat cable 130 may be a flexible printed circuit (FPC) cable. In some embodiments, the flexible flat cable 130 is prepared by forming a circuit on any existing flexible substrate, such as a polymer sheet or a metal sheet, by any existing disposing method.

As shown in FIG. 2, FIG. 3, FIG. 4, and FIG. 5, the fixed end 132 is disposed corresponding to an edge of the movable substrate 162 and is located outside the fixing frame 110, so that the fixed end 132 may be electrically connected (for example, soldered or welded) to a signal circuit of an electronic device. The signal circuit may be a circuit disposed on the base 120 or a flat signal cable 180 that is not disposed on the base 120. In the present embodiment, the flat signal cable 180 is disposed on the base 120 as an example.

As shown in FIG. 2, FIG. 3, FIG. 4, and FIG. 5, in a specific embodiment, the fixed end 132 is fixed to the fixing portion 114, particularly to the side of the fixing portion 114 facing the base 120, so that the fixed end 132 is located outside the fixing frame 110 and is indirectly connected to the fixing frame 110 through the fixing portion 114. The fixed end 132 may partially protrude out from the fixing portion 114, or may not protrude and be hidden on the bottom surface of the fixing portion 114. Therefore, when the fixing portion 114 is fixed to the base 120, the fixed end 132 may be temporarily or permanently fixed to the flat signal cable 180 to facilitate subsequent electrical connection operations.

In different embodiments, the fixed end 132 is vertically fixed to the fixing portion 114 and is electrically connected to the signal circuit or flat signal cable 180 described above in a perpendicular manner. The signal circuit or signal flat cable 180 is configured to be electrically connected to a control module of an electronic device such as a smart phone, and the signal flat cable 180 may be a flat printed circuit connector. In one embodiment, the fixed end 132 and the flat signal cable 180 are configured to be connected to one end of the fixed end 132, and may be disposed on the fixing portion 114 of the fixing frame 110 or the base 120, and the other end of the flat signal cable 180 is connected to the control module of the electronic device.

As shown in FIG. 2, FIG. 3, FIG. 4 and FIG. 5, one end of the floating section 134 is connected to the fixed end 132, and the floating section 134 is disposed to float over the upper surface of the movable substrate 162, and extends in the accommodating space of the fixing frame 110. The floating section 134 is not directly fixed to the image sensor assembly 160, the lens assembly 140 and/or the fixing frame 110. Specifically, a gap is maintained between the lens assembly 140 and the fixing frame 110, and the floating section 134 passes through the gap, so that the floating section 134 is disposed to float in the accommodating space. A flat part of the floating section 134 is parallel to the optical axis of the optical lens set 142, that is, the thickness direction of the floating section 134 is perpendicular to the optical axis, and the thickness of the floating section 134 is smaller than the gap between the lens assembly 140 and the fixing frame 110, so the floating section 134 is floatable in the gap.

As shown in FIG. 2, FIG. 3, FIG. 4, and FIG. 5, the electrical connection end 136 extends from the other end of the floating section 134, and the electrical connection end 136 protrudes from the bottom surface side 110b of the fixing frame 110 to facilitate electrical connection operations (such as soldering, welding, bonding, crimping or snapping).

As shown in FIG. 3 and FIG. 6, the electrical connection end 136 of the flexible flat cable 130 is arranged perpendicular to the upper surface of the movable substrate 162, and maintaining the state that the electrical connection end 136 and the upper surface of the movable substrate 162 are perpendicular to each other, the plurality of terminals 136a on an edge of the electrical connection end 136 are electrically connected to the electrical connection pads 162a of the movable substrate 162. For example, by melting solder balls or other soldering flux, the plurality of terminals 136a on an edge of the electrical connection end 136 are soldered or welded to the electrical connection pads 162a of the movable substrate 162. Therefore, the electrical connection end 136 is electrically connected to the movable substrate 162 in a manner of being perpendicular to the upper surface. In the present embodiment, the electrical connection pads 162a are located on the upper surface of the movable substrate 162 and parallel to the upper surface of the movable substrate 162, so that the terminals 136a and the electrical connection pads 162a are soldered or welded together in a perpendicular manner.

As shown in FIG. 6, in the present embodiment, the electrical connection pads 162a of the movable substrate 162 are located on the upper surface of the movable substrate 162, and the upper surface is perpendicular to the optical axis of the optical lens set 142. The electrical connection end 136 does not need to be bent to be parallel to the upper surface. The electrical connection end 136 is connected to the electrical connection pads 162a of the movable substrate 162 in a state of being perpendicular to the upper surface.

Figure 9:
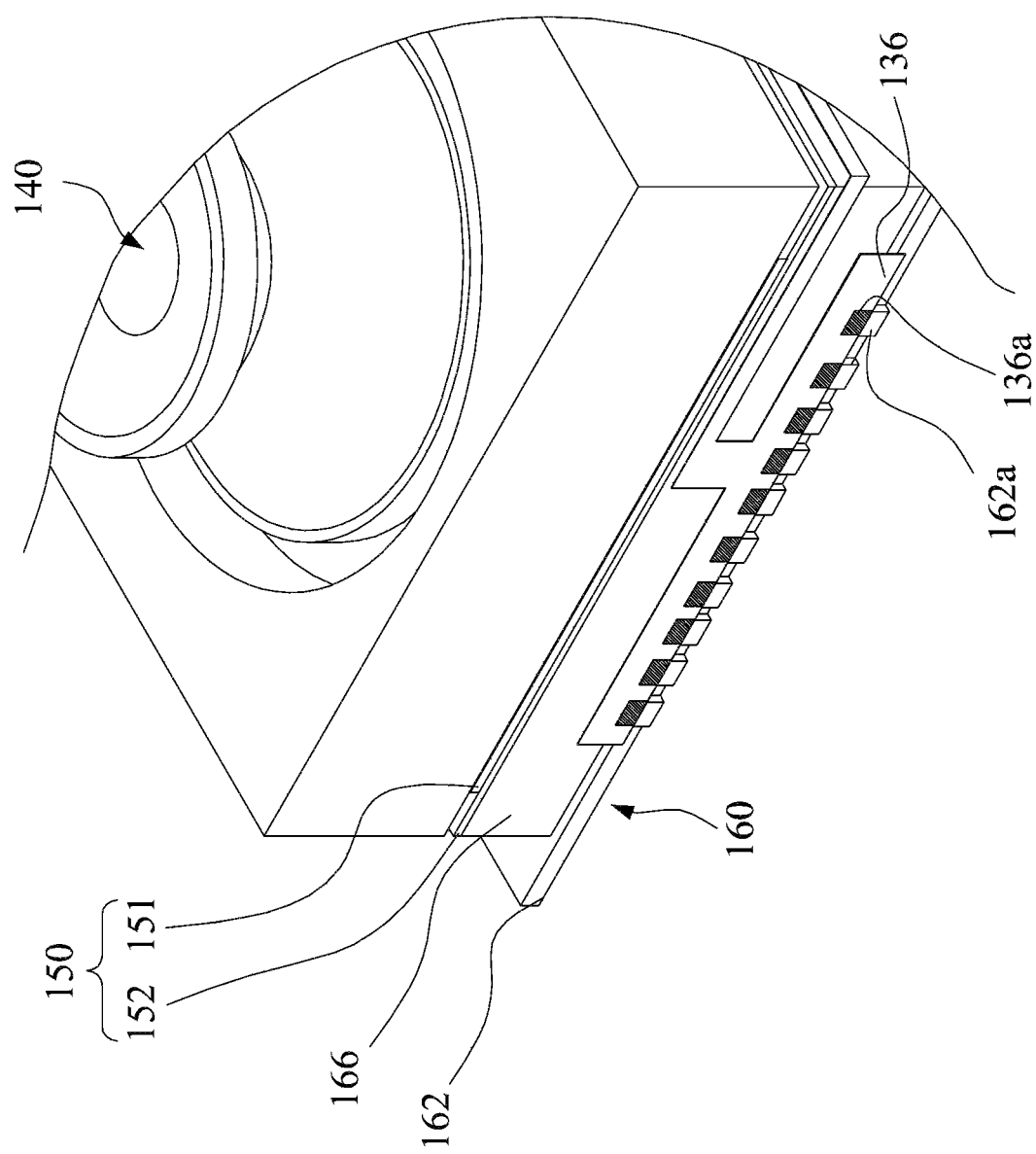
FIG. 9 is a partial perspective view of part of components in the first embodiment of this disclosure.

As shown in FIG. 9, in some embodiments, the electrical connection pads 162a of the movable substrate 162 are located on the lateral surface of the movable substrate 162, and the lateral surface is parallel to the optical axis of the optical lens set 142. The electrical connection end 136 and the electrical connection pads 162a of the movable substrate 162 are parallel to each other and connected to each other, and the electrical connection end 136 is parallel to the lateral surface and perpendicular to the upper surface. In the present embodiment, the electrical connection pads 162a are located on the lateral surface of the movable substrate 162 and perpendicular to the upper surface of the movable substrate 162, so that the terminals 136a and the electrical connection pads 162a are soldered or welded together in a parallel manner.

In some embodiments, the fixed end 132 may be electrically connected to the signal circuit or the flat signal cable 180 in a vertical direction (a direction parallel to the optical axis). For the connection structure, refer to FIG. 3, FIG. 4 and the foregoing description. For example, the flat signal cable 180 is provided with a row of electrical connection pads 180a as shown in FIG. 3, and the fixed end 132 is soldered or welded to the row of electrical connection pads 180a of the flat signal cable 180 in a vertical direction. Alternatively, the flat signal cable 180 is provided with two or more rows of electrical connection pads 180a, and two or more rows of fixed ends 132 are correspondingly extended from one end of the floating section 134. The two or more rows of fixed ends 132 may be respectively soldered or welded to the two or more rows of electrical connection pads 180a of the flat signal cable 180 in a vertical direction. In some embodiments, the fixed end 132 of the flexible flat cable 130 is perpendicular to the surface of the flat signal cable 180 where the electrical connection pads 180a are disposed, and the terminals of the fixed end 132 and the electrical connection pads 180a are soldered or welded together in a perpendicular manner (not shown). For the connection structure, refer to the related description of the terminals 136a and the electrical connection pads 162a in the foregoing embodiments. In some embodiments, the processing procedure of the vertical electrical connection may be realized by laser soldering or welding equipment.

The assembly method of the imaging apparatus 100 is further described below. The assembly process is subdivided into a plurality of sub-processes. After semi-finished products are produced separately, the semi-finished products are combined to form the imaging apparatus 100.

Figure 10:
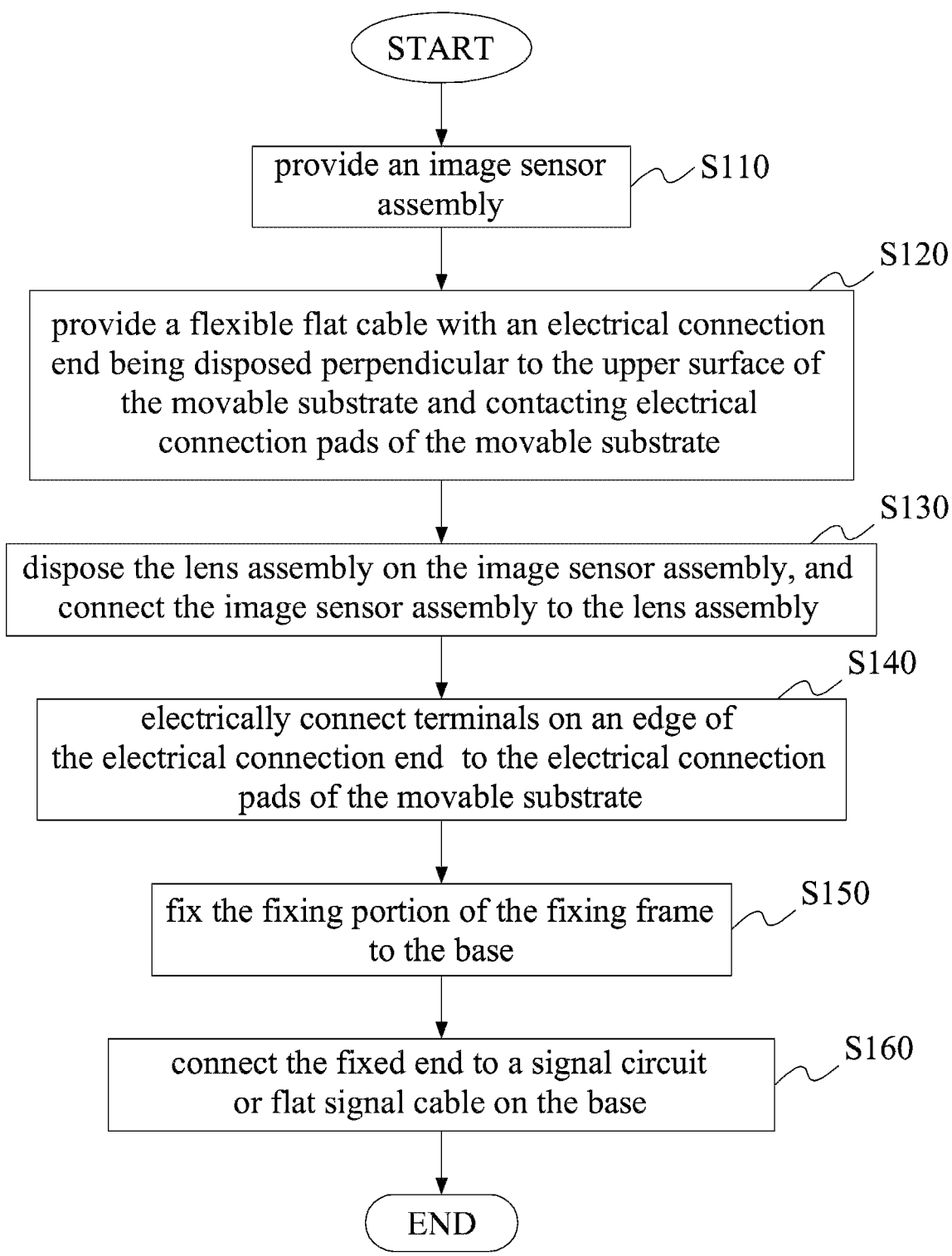
FIG. 10 is a flow chart of a method for assembling the imaging apparatus in the embodiments of this disclosure.
Figure 11:
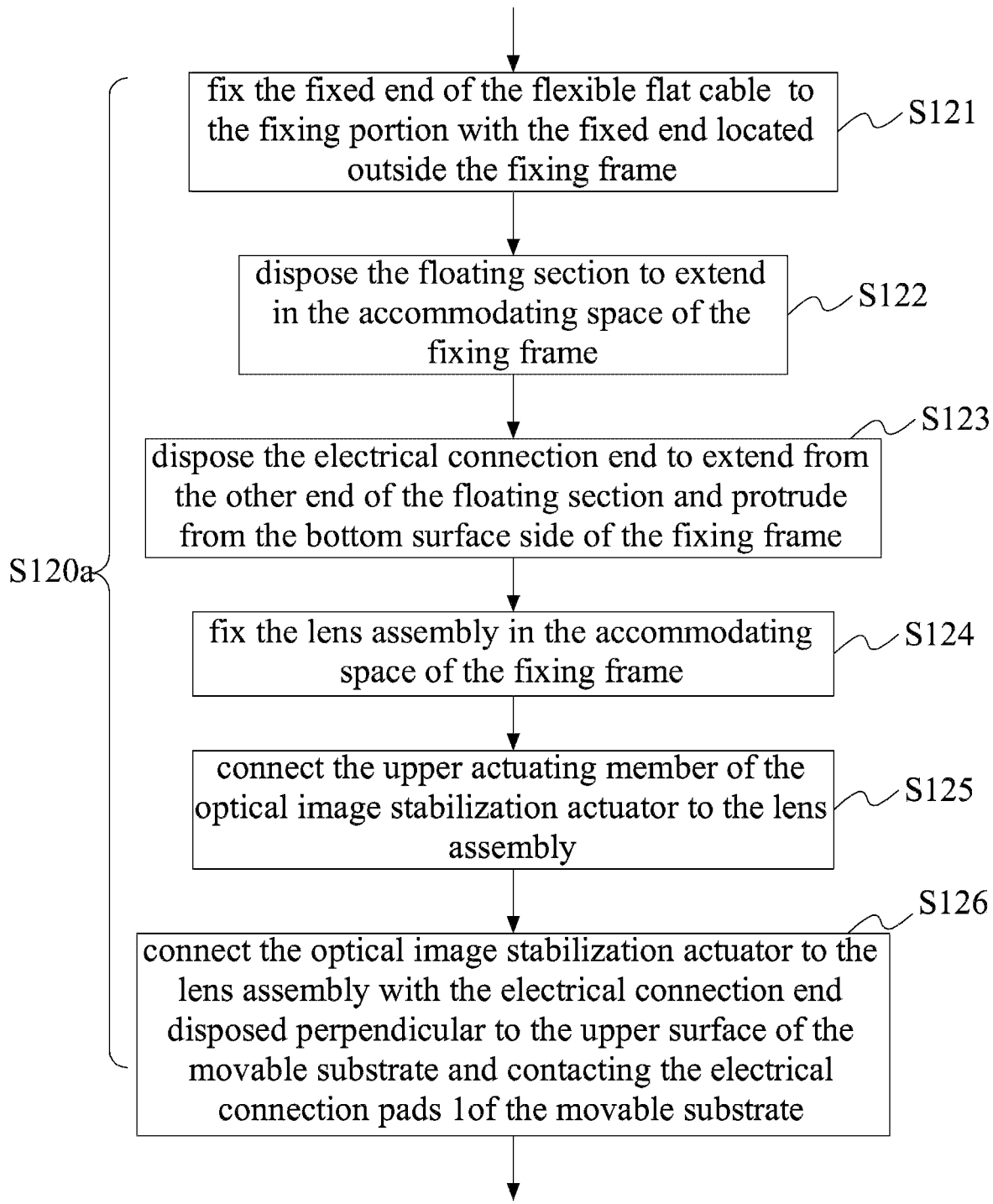
FIG. 11 is a partial flow chart of a method for assembling the imaging apparatus in the embodiments of this disclosure.

As shown in FIG. 10 and FIG. 11, first an image sensor assembly 160 is provided, as shown in step S110. The image sensor assembly 160 includes a movable substrate 162, an image sensing chip 164, a bearing frame 166 and an optical glass plate 168.

In detail, the step of providing the image sensor assembly 160 includes providing a movable substrate 162. An upper surface of the movable substrate 162 is provided with electrical connection pads 162a and necessary signal circuits. Next, the image sensing chip 164 is disposed on the upper surface of the movable substrate 162 and is electrically connected to the signal circuit of the movable substrate 162. The bearing frame 166 is disposed on the movable substrate 162 and surrounds the image sensing chip 164. Finally, the optical glass plate 168 is disposed on the bearing frame 166 so that the bearing frame 166 and the optical glass plate 168 form a packaging structure to cover the image sensing chip 164. The image sensing chip 164 is covered by the packaging structure of the bearing frame 166 and the optical glass plate 168, so that particles may be prevented from contaminating the image sensing chip 164 in the subsequent assembly stage and alignment process.

As shown in FIG. 10, a flexible flat cable 130 is provided with an electrical connection end 136 being disposed perpendicular to the upper surface of the movable substrate 162 and contacting a plurality of electrical connection pads 162a of the movable substrate 162, as shown in step S120. At the same time, the floating section 134 is disposed to float over the upper surface of the movable substrate 162, and the fixed end 132 is located on the upper surface of the movable substrate 162 and is disposed corresponding to an edge of the movable substrate 162.

As shown in FIG. 10, the lens assembly 140 is disposed on the image sensor assembly 160, and the image sensor assembly 160 is connected to the lens assembly 140, as shown in step S130. The execution order of the step S120 and step S130 may be interchanged or executed simultaneously.

In particular, in this embodiment, the image sensor assembly 160 and the lens assembly 140 are connected through an optical image stabilization actuator 150. Therefore, the details of step S130 include providing an optical image stabilization actuator 150, wherein the optical image stabilization actuator 150 includes an upper actuating member 151 and a lower actuating member 152, and the lower actuating member 152 is configured to move with respect to the upper actuating member 151 on a plane perpendicular to the optical axis. The upper actuating member 151 is connected to the lens assembly 140, and the image sensor assembly 160 is connected to the lower actuating member 152.

In some embodiments, the image sensor assembly 160 and the lens assembly 140 are not connected through the optical image stabilization actuator 150. For example, after the image sensor assembly 160 is connected to the lens assembly 140, an optical image stabilization actuators 150 is further disposed around the lens assembly 140 and the image sensor assembly 160, and a driving member of the optical image stabilization actuator 150 is connected to the lens assembly 140 and/or the image sensor assembly 160, to drive the lens assembly 140 and/or the image sensor assembly 160 to shift/rotate/tilt relative to the optical axis to compensate for vibration.

As shown in FIG. 11, step S120 and step S130 may be integrated into step S120a. As shown in FIG. 2, FIG. 4 and FIG. 5, the fixing frame 110, the flexible flat cable 130, the lens assembly 140 and the optical image stabilization actuator 150 in the assembly stage may first form a semi-finished product. First, the fixed end 132 of the flexible flat cable 130 is fixed to the fixing portion 114 so that the fixed end 132 is located outside the fixing frame 110 and is indirectly connected to the fixing frame 110 through the fixing portion 114, as shown in step S121. At this time, the floating section 134 is disposed to extend in the accommodating space of the fixing frame 110, as in step S122. The electrical connection end 136 is disposed to extend from the other end of the floating section 134 and protrude from the bottom surface side 110b of the fixing frame 110, as in step S123. Next, the lens assembly 140 is fixed in the accommodating space of the fixing frame 110, as shown in step S124, and the upper actuating member 151 of the optical image stabilization actuator 150 is connected to the lens assembly 140, as shown in step S125.

As shown in FIG. 2 and FIG. 11, at this time, the fixing frame 110, the flexible flat cable 130, the lens assembly 140, and the optical image stabilization actuator 150 form a semi-finished product that may be moved separately. Finally, the lower actuating member 152 of the optical image stabilization actuator 150 is connected to the bearing frame 166 as shown in FIG. 6 or FIG. 9 to connect the image sensor assembly 160 to the lens assembly 140, and the electrical connection end 136 is disposed perpendicular to the upper surface of the movable substrate 162 to approach or contact the electrical connection pads 162a of the movable substrate 162, as shown in step S126. At this time, execution of step S120a is execution of steps S121 to S126, that is, steps S120 and S130 are executed simultaneously.

Figure 12:
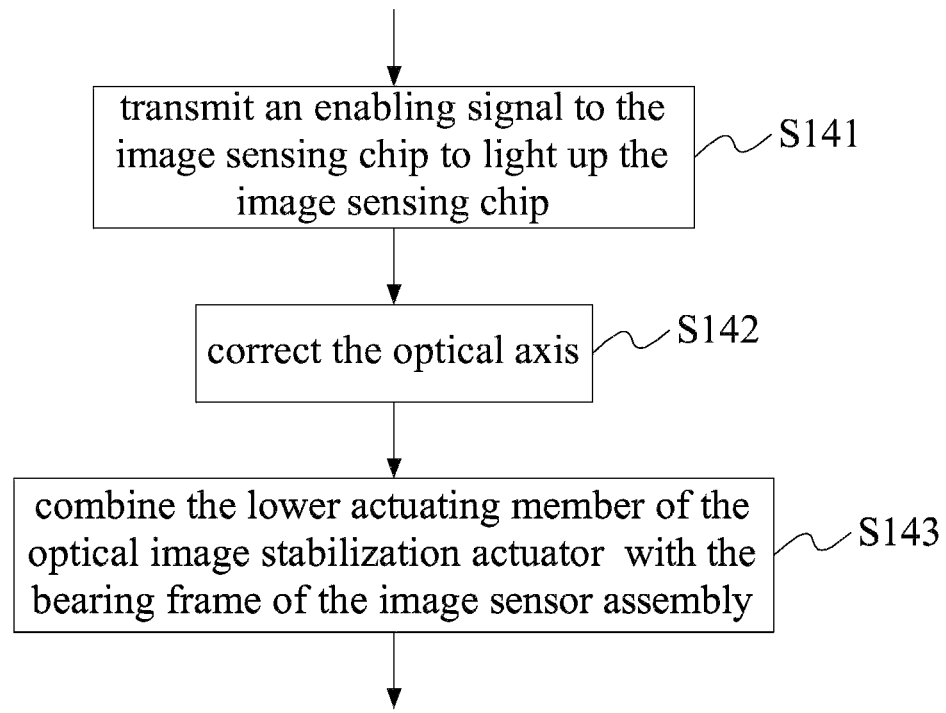
FIG. 12 is a partial flow chart of a method for assembling the imaging apparatus in the embodiments of this disclosure.

Referring to FIG. 12, in step S130 or step S126, the step of connecting the image sensor assembly 160 to the lens assembly 140 further includes performing an active alignment process. The details are described below.

First, signal connection devices such as a probe and a probe board are used to transmit an enabling signal to the image sensing chip 164 to light up (enable) the image sensing chip 164, as shown in step S141. The enabling signal includes the power required for the operation of the image sensing chip 164, or the enabling signal is the power required for the operation of the image sensing chip 164. Then, according to the test images continuously generated by the image sensing chip 164, the relative position between the lens assembly 140 and the optical axis thereof and the image sensing chip 164 are adjusted accordingly to correct the optical axis, as in step S142. Finally, the lower actuating member 152 of the optical image stabilization actuator 150 is combined with the bearing frame 166 of the image sensor assembly 160 by means of adhesive dispensing, etc. to connect the lens assembly 140 to the image sensor assembly 160 through the optical image stabilization actuator 150, as shown in step S143.

In some embodiments, in the active alignment process, the lower actuating member 152 may also be fixed to the image sensor assembly 160, especially the bearing frame 166 of the image sensor assembly 160 by adhesive dispensing. Alternatively, in some embodiments, referring to FIG. 25 and FIG. 26, in the assembly process, an auxiliary frame 167 may also be connected to the lower actuating member 152 of the optical image stabilization actuator 150, and the auxiliary frame 167 is then connected to the upper surface of the movable substrate 162 to combine the two semi-finished products. For example, the image sensor assembly 160 is a semi-finished product, and other components such as the auxiliary frame 167, the optical image stabilization actuator 150, and the lens assembly 140 form another semi-finished product. The Optical image stabilization actuator 150 and the lens assembly 140 are connected to the movable substrate 162 of the image sensor assembly 160 through the auxiliary frame 167.

As shown in FIG. 1, FIG. 2, FIG. 6 and FIG. 10, the electrical connection end 136 is electrically connected, wherein a plurality of terminals 136a on an edge of the electrical connection end 136 are electrically connected (for example, soldered or welded) to the plurality of electrical connection pads 162a of the movable substrate 162, as shown in step S140. Step S140 may also be performed after step S120 or step S126. Finally, the fixing portion 114 of the fixing frame 110 is fixed to the base 120, and the fixed end 132 is connected to a signal circuit or flat signal cable 180 on the base 120 to complete the assembly of the imaging apparatus 100, as shown in step S150 and step S160. As shown in FIG. 10 to FIG. 12, in the present embodiment, after the active alignment process of the image sensor assembly 160 and the lens assembly 140 is performed, the image sensor assembly 160 and the lens assembly 140 together with the fixing frame 110 are assembled on the base 120. In some embodiments, the active alignment process of the image sensor assembly 160 and the lens assembly 140 may also be performed after the image sensor assembly 160, the lens assembly 140 and the fixing frame 110 are assembled to the base 120. In this case, the relative positions of the image sensor assembly 160 and the lens assembly 140 in the optical axis direction are not fixed before the active alignment is completed (for example, adhesive is pre-applied but the adhesive is not cured).

Figure 13:
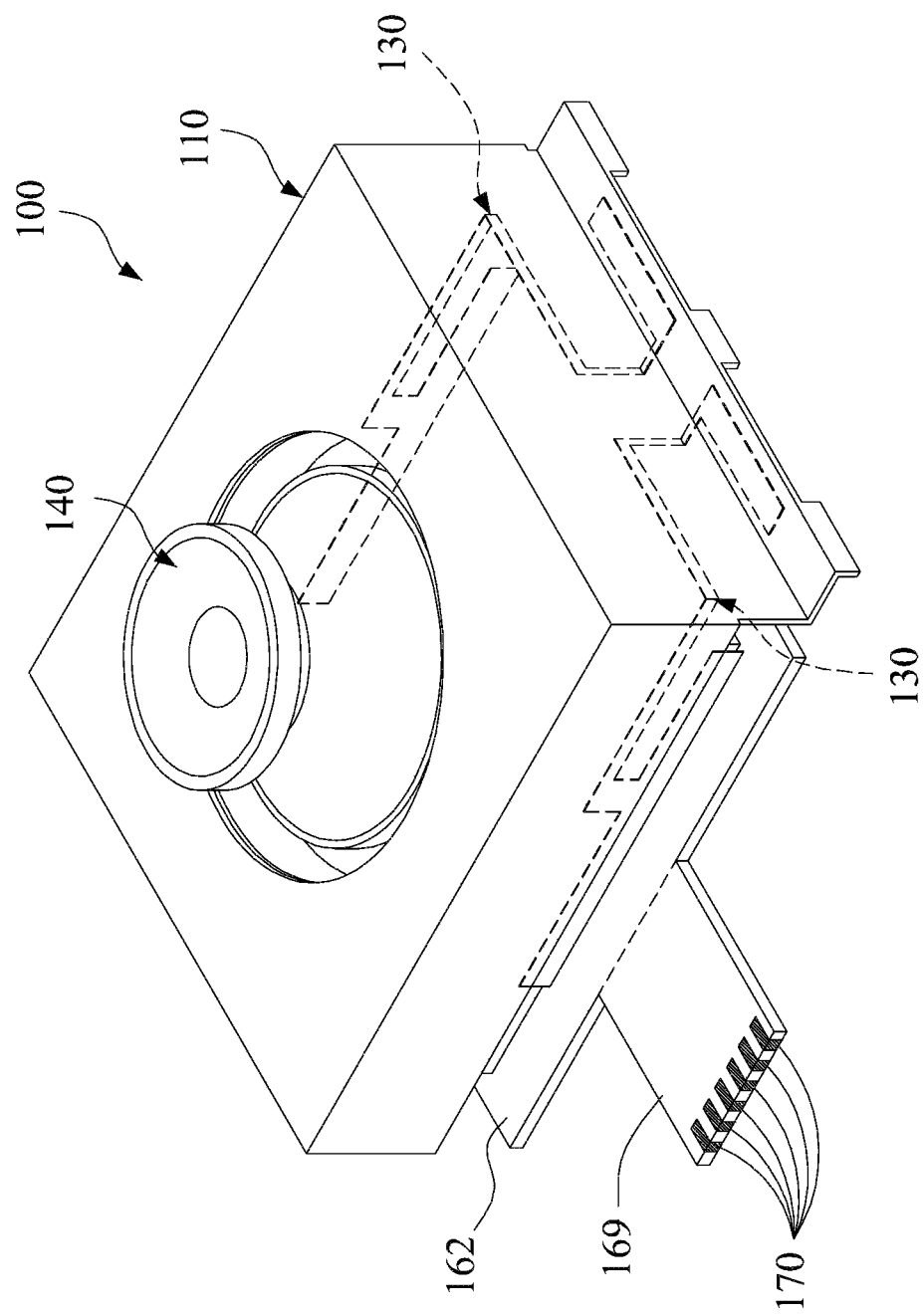
FIG. 13 is a perspective view of part of components of the imaging apparatus in a second embodiment of this disclosure.
Figure 14:
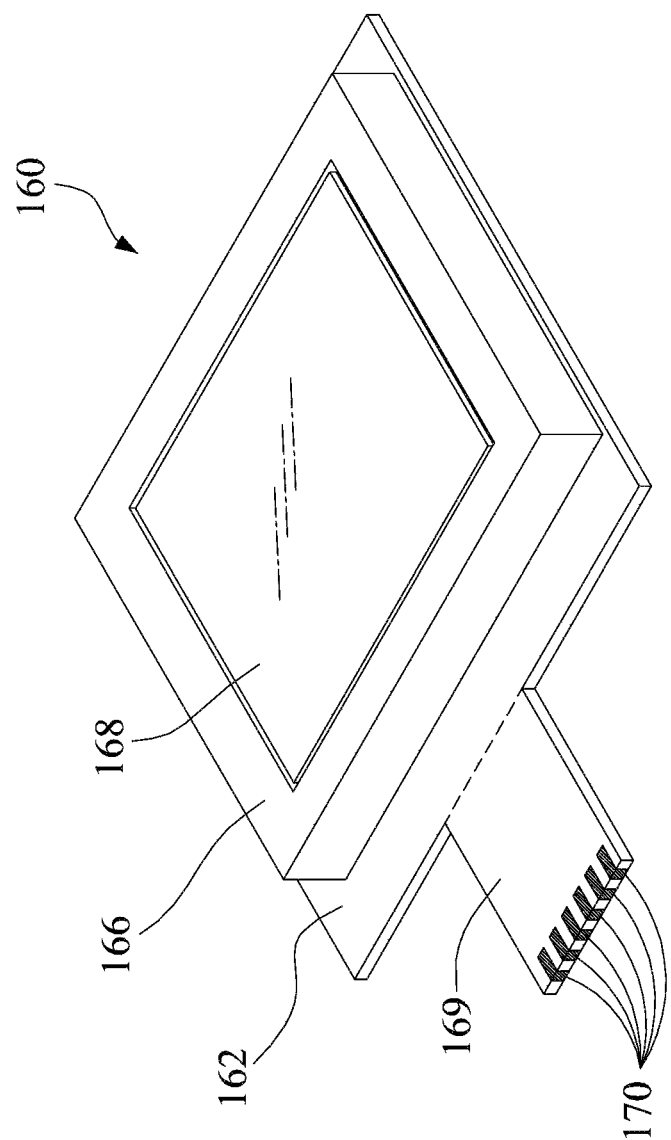
FIG. 14 is a perspective view of an image sensor assembly in the second embodiment of this disclosure.
Figure 15:
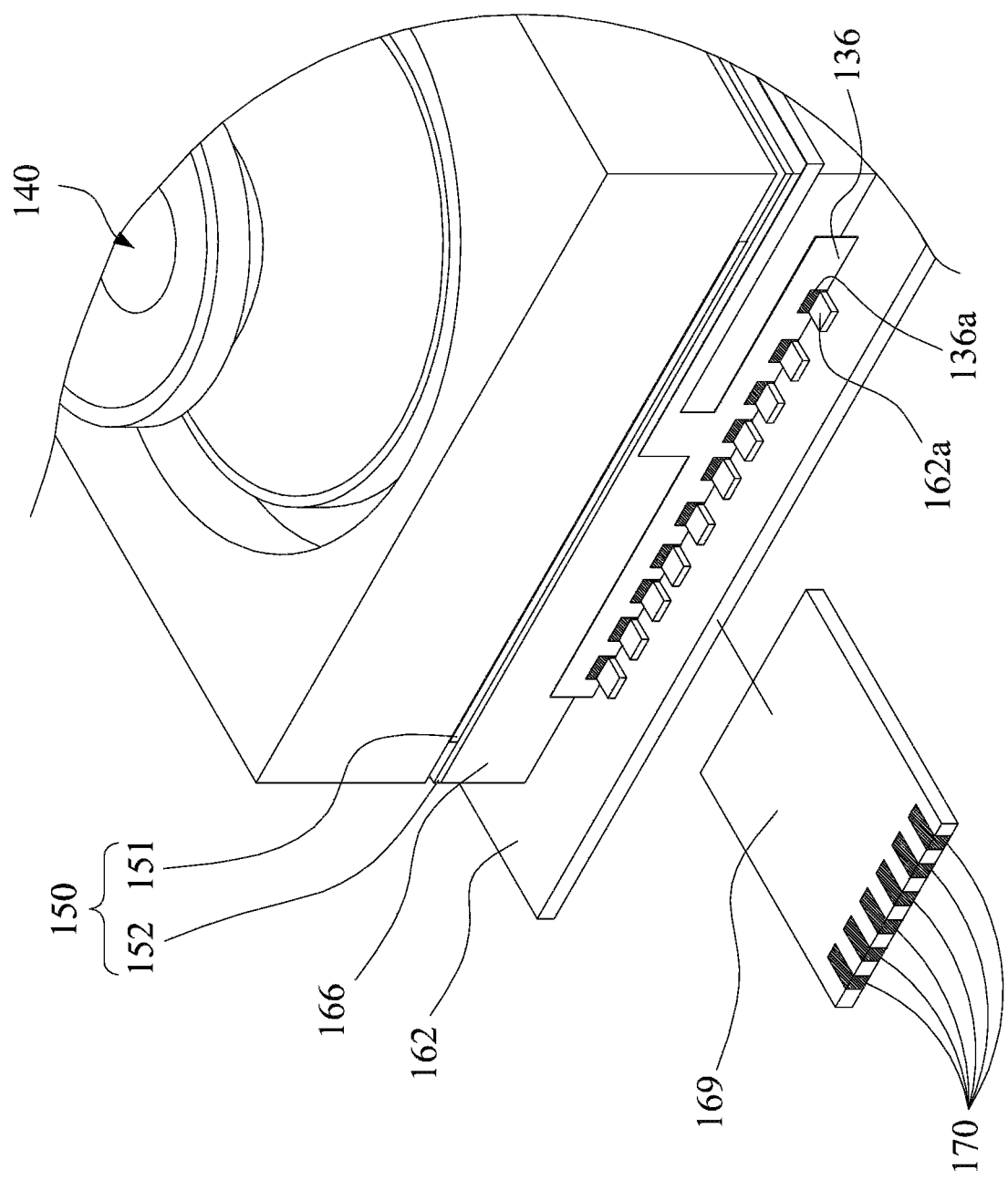
FIG. 15 is a perspective view of part of components of the imaging apparatus in the second embodiment of this disclosure.

FIG. 13, FIG. 14, and FIG. 15 show an imaging apparatus 100 disclosed in a second embodiment of this disclosure. The imaging apparatus 100 of the second embodiment is substantially the same as that disclosed in the first embodiment, except that the imaging apparatus 100 of the second embodiment further includes a plurality of signal feed-in contacts 170 disposed on the movable substrate 162. The signal feed-in contacts 170 may be disposed on the upper surface, the lower surface, the edge, or the extended protruding part of the movable substrate 162. The signal feed-in contacts 170 are exposed from the image sensor assembly 160 and are not covered by the components and structures of the image sensor assembly 160. The signal feed-in contacts 170 are electrically connected to the image sensing chip 164 through a circuit disposed on or not disposed on the movable substrate 162 to transmit an enabling signal for enabling (lighting up) the image sensing chip 164, to perform an active alignment process to correct the relative position between the lens assembly 140 and the optical axis thereof and the image sensing chip 164.

As shown in FIG. 13, FIG. 14 and FIG. 15, in the second embodiment, the image sensor assembly 160 in the assembly stage includes a signal feed-in part 169. The signal feed-in part 169 extends from an edge of the movable substrate 162. The signal feed-in part 169 is a rigid board that integrally extends from the movable substrate 162 or a soft board connected to the movable substrate 162. Signal feed-in contacts 170 are disposed on the signal feed-in part 169. The signal feed-in contacts 170 are configured to be contacted by the signal connection devices such as a probe and a probe board, or the signal feed-in part 169 is configured to be an electrical connector. The electrical connector is configured to connect another electrical connector to transmit an enabling signal to the image sensing chip 164 to light up (enable) the image sensing chip 164 before a flat signal cable 180 (such as an FPC connector) is assembled. As shown in FIGS. 14 and 15, it is noted that the vertical projections of the signal feed-in contacts 170 disposed on the signal feed-in part 169 and the bearing frame 166 do not overlap.

As shown in FIG. 15, after all or part of the assembly operation of the imaging apparatus 100 is completed, the imaging apparatus 100 may transmit signals to the signal circuit or flat signal cable 180 through the flexible flat cable 130, and the signal feed-in part 169 is no longer required. Therefore, the signal feed-in part 169 may be further removed to save space. For example, the signal feed-in part 169 may be removed by cutting tools such as lasers, CNC equipment, or blades. The step of removing the signal feed-in part 169 may be performed after all the assembly operations of the imaging apparatus 100 or after the active alignment process is performed.

Figure 17:
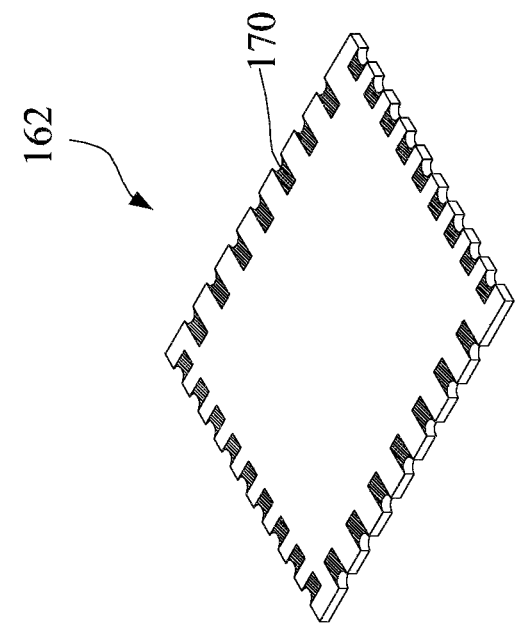
FIG. 17 is a perspective view of the movable substrate in the third embodiment of this disclosure.
Figure 16:
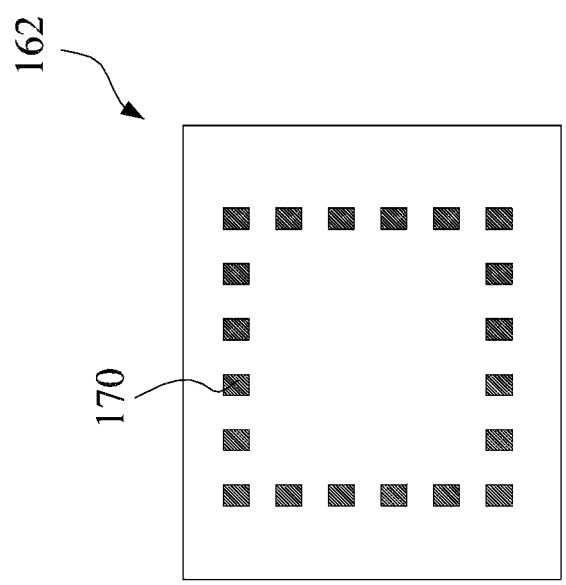
FIG. 16 is a bottom view of a movable substrate in a third embodiment of this disclosure.

FIG. 16 and FIG. 17 show a movable substrate 162 disclosed in a third embodiment of this disclosure, which is adapted to replace the movable substrate 162 in one or more embodiments of this disclosure. In the third embodiment, the signal feed-in contacts 170 are disposed on the lower surface of the movable substrate 162, as shown in FIG. 16, or the signal feed-in contacts 170 are disposed on an edge of the movable substrate 162, as shown in FIG. 17.

As shown in FIG. 16 and FIG. 17, the signal feed-in contacts 170 on a lower surface or an edge of the movable substrate 162 are exposed to outside, and may be contacted by signal connection devices such as a probe and a probe board, to transmit an enabling signal for enabling the image sensing chip 164, so that the image sensing chip 164 is lit up for performing active alignment. Therefore, with the use of the movable substrate 162 of the third embodiment, the signal feed-in part 169 needs not to be cut off in the assembly process.

As shown in FIG. 15 to FIG. 17, the signal feed-in part 169 or the signal feed-in contacts 170 may be applied to any process of the imaging apparatus 100 in which the image sensing chip 164 needs to be lit up, not limited to the disposition of the flexible flat cable 130 of the imaging apparatus 100 in the above embodiments. For example, before the image sensing chip 164 is electrically connected to other signal transmission or control components of the imaging apparatus 100, if active alignment is required, the signal feed-in part 169 or the signal feed-in contacts 170 may be disposed to light up the image sensing chip 164 for performing active alignment.

Figure 18:
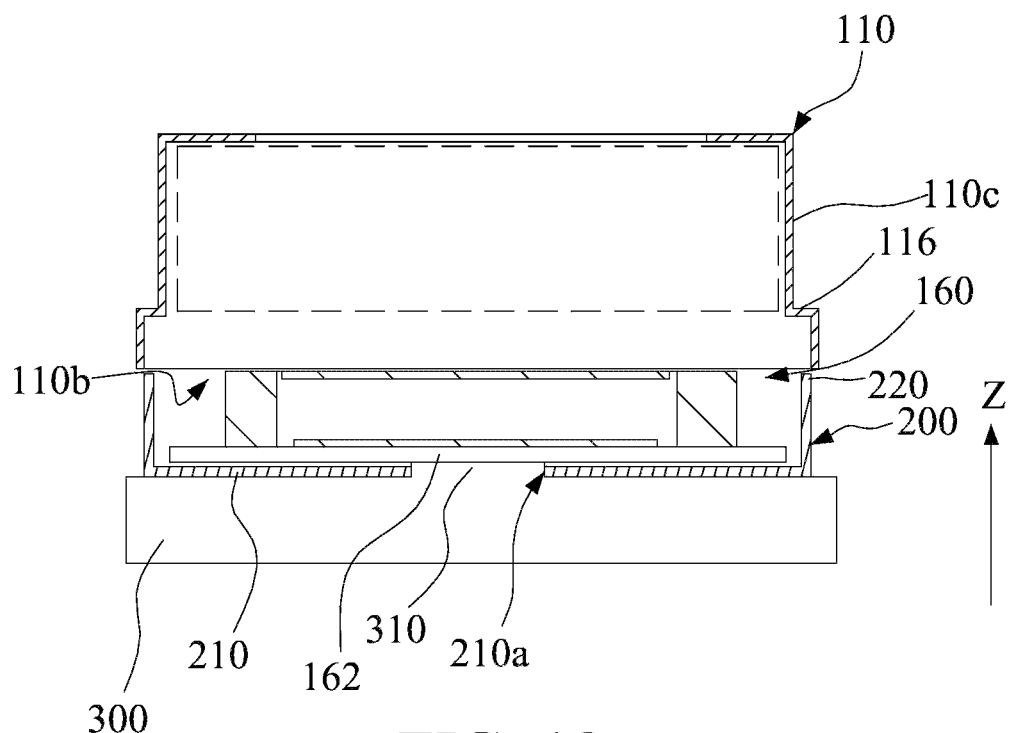
FIG. 18 is a cross-sectional view of a bottom case, a bearing jig and an imaging apparatus in the third embodiment of this disclosure.
Figure 19:
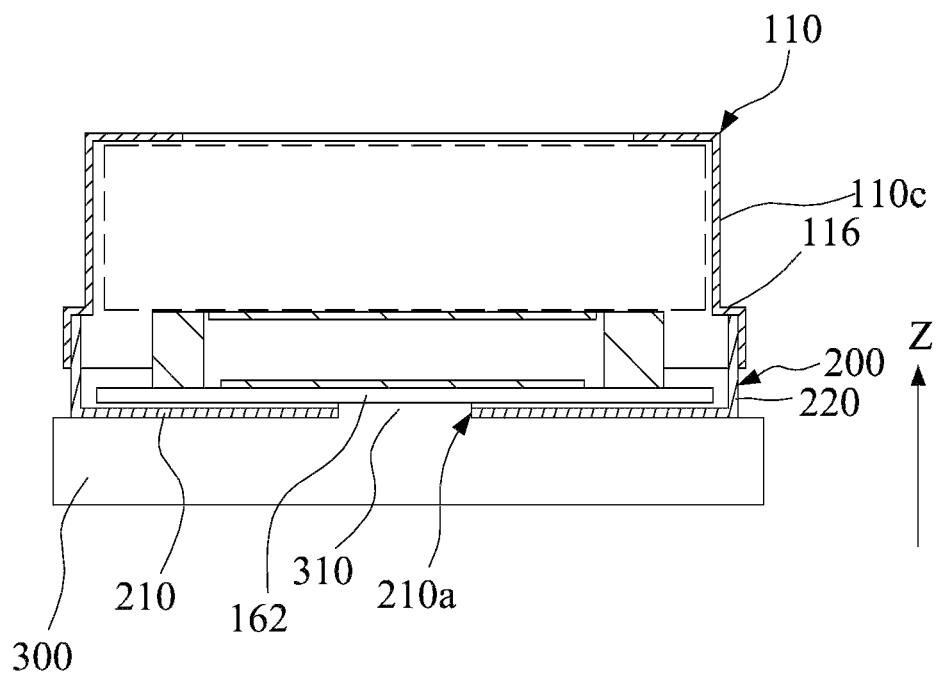
FIG. 19 is another cross-sectional view of the bottom case, the bearing jig and the imaging apparatus in the third embodiment of this disclosure.

FIG. 18 and FIG. 19 show a bottom case 200 and a bearing jig 300 provided in a fourth embodiment of this disclosure, adapted to bear the image sensor assembly 160 in the assembly process to facilitate the combination of the lens assembly 140 and the image sensor assembly 160.

As shown in FIG. 18, the bottom case 200 includes a bearing board 210 and a positioning side wall 220 surrounding the bearing board 210, and the bearing board 210 includes a hole 210a. The image sensor assembly 160 is placed above the bearing board 210 and covers the hole 210a. The bearing jig 300 is configured for placing the bottom case 200 thereon, and a bearing convex part 310 passes through the hole 210a to lift the movable substrate 162 of the image sensor assembly 160. A predetermined distance is maintained between the image sensor assembly 160 and the bearing board 210 to facilitate the actuation of the image sensor assembly 160 during image stabilization compensation. In the assembly process, active alignment may be performed first to adjust the relative position between the fixing frame 110 (fixed with the lens assembly 140) and the image sensor assembly 160 to correct the optical axis.

Figure 20:
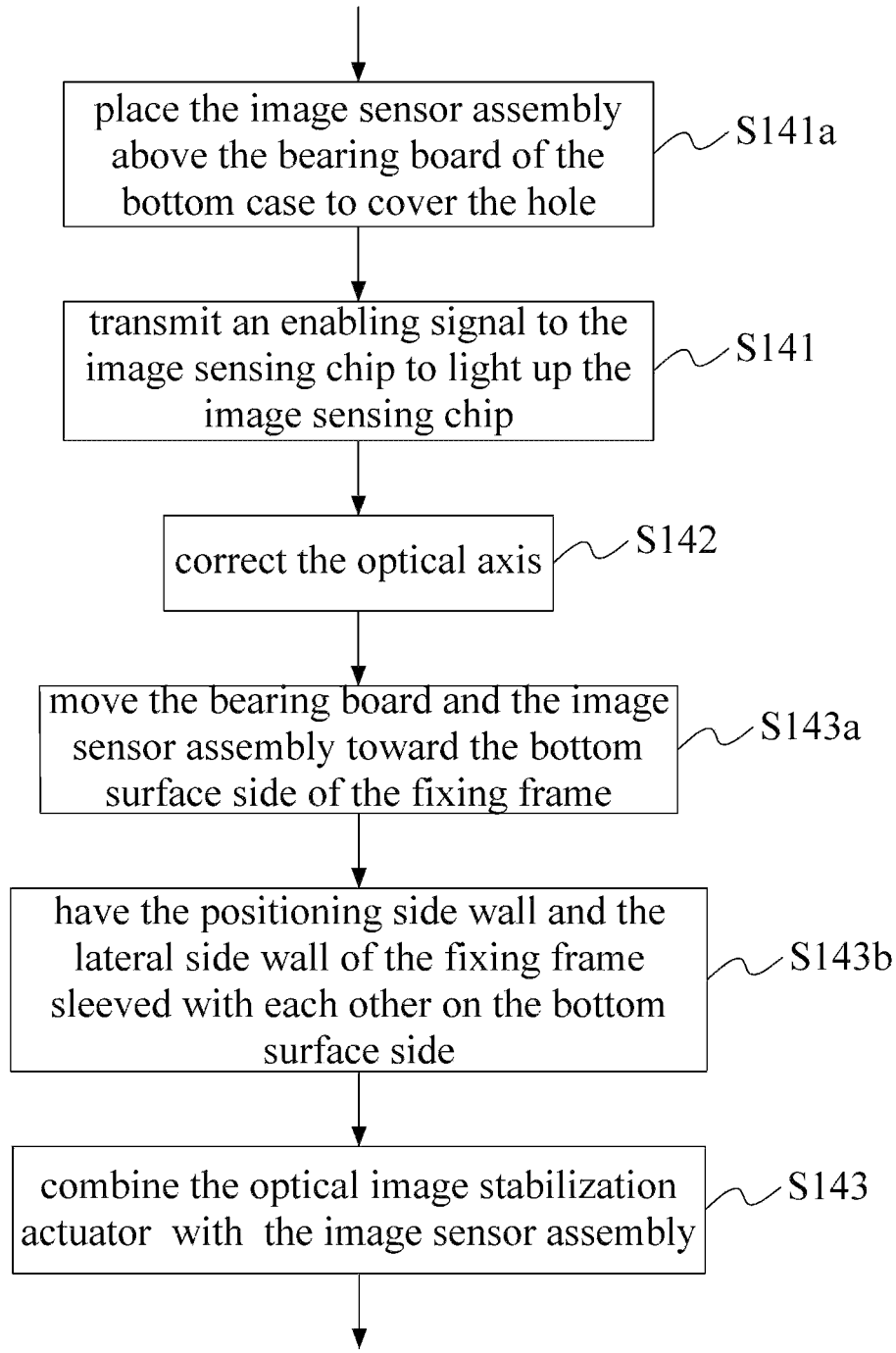
FIG. 20 is a partial flow chart of a method for assembling the imaging apparatus in the embodiments of this disclosure.

Referring to FIG. 20, when the bottom case 200 and the bearing jig 300 are applied, the assembly method is modified. The step of connecting the image sensor assembly 160 to the lens assembly 140 (step S130 or step S126) is described in detail as follows.

As shown in FIG. 18 and FIG. 20, first, the image sensor assembly 160 is placed above the bearing board 210 of the bottom case 200 and cover the hole 210a, as shown in step S141a, and then steps S141 and S142 are performed to complete the correction of the optical axis. In the above steps, the bottom case 200 is placed on the bearing jig 300.

As shown in FIG. 19 and FIG. 20, the bearing convex part 310 of the bearing jig 300 passes through the hole 210a of the bearing board 210. The bearing jig 300 bears the bearing board 210 of the bottom case 200, and the bearing convex part 310 bears the image sensor assembly 160. Accordingly, the bearing board 210 and the image sensor assembly 160 are moved toward the bottom surface side 110b of the fixing frame 110, as shown in step S143a. The positioning side wall 220 and the lateral side wall 110c of the fixing frame 110 are sleeved with each other on the bottom surface side 110b, as shown in step S143b.

As shown in FIG. 19, after the positioning side wall 220 and the lateral side wall 110c of the fixing frame 110 are sleeved with each other and positioned on the bottom surface side 110b, the bearing convex part 310 causes the image sensor assembly 160 to be lifted to connect the lens assembly 140. For example, the bearing frame 166 is brought into contact with the lower actuating member 152 of the optical image stabilization actuator 150, so that the pre-coated adhesive may connect the lower actuating member 152 of the optical image stabilization actuator 150 to the bearing frame 166 of the image sensor assembly 160, as shown in step S143. The image sensor assembly 160 is lifted up by the bearing convex part 310, and the position of the image sensor assembly 160 is adjusted in the optical axis direction Z in the second stage, that is, the distance between the bottom case 200 and the image sensor assembly 160 is adjusted, and the distance between the bearing board 210 of the bottom case 200 and the image sensor assembly 160 is reserved to ensure the actuation space of the image sensor assembly 160 for performing OIS compensation.

As shown in FIG. 18 and FIG. 19, in a fourth embodiment, the positioning side wall 220 matches the bottom surface side 110b of the fixing frame 110, and the lateral side wall 110c of the fixing frame 110 is sleeved on the positioning side wall 220 at the bottom surface side 110b. In addition, the inner side surface of the lateral side wall 110c of the fixing frame 110 is provided with a stop structure 116. After the positioning side wall 220 is sleeved by the lateral side wall 110c of the fixing frame 110, the positioning side wall may be stopped by the stop structure 116 to limit the minimum distance between the bottom case 200 and the lens assembly 140. Since the positioning side wall 220 and the lateral side wall 110c of the fixing frame 110 match each other but are not engaged with each other, the positioning side wall 220 and the lateral side wall 110c of the fixing frame 110 have the ability of relative displacement in the optical axis direction Z. When the lens assembly 140 and the image sensor assembly 160 are combined by an adhesive or other fixing means, the distance between the bottom case 200 and the image sensor assembly 160 may be adjusted to compensate the tolerance generated by the lens assembly 140 and the image sensor assembly 160 in the assembly process or by the components themselves.

Next, glue may be applied and cured at the junction between the positioning side wall 220 and the lateral side wall 110c or the bottom surface side 110b of the fixing frame 110 to fix the relative position between the bottom case 200 and the image sensor assembly 160. At this time, the bottom case 200 is used to replace the base 120 in one or more of the foregoing embodiments. In some embodiments, before assembly or adjustment of the positioning side wall 220 and the fixing frame 110, the junction between the positioning side wall 220 and the fixing frame 110 may also be coated with glue first, and the glue may be cured after the assembly or adjustment.

Figure 21:
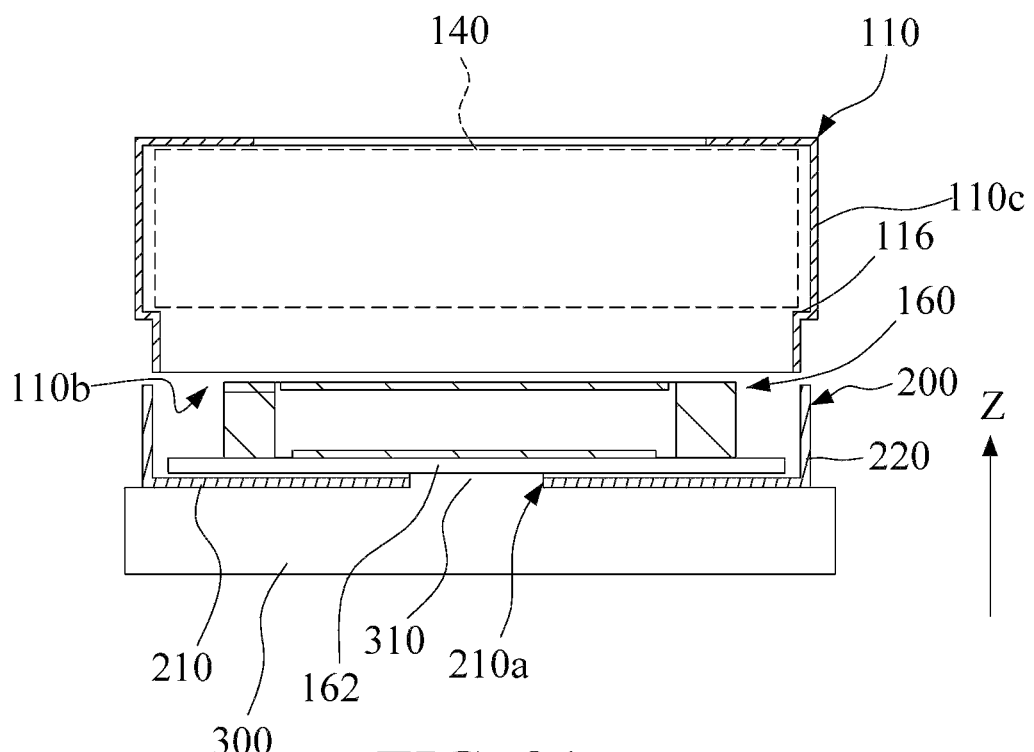
FIG. 21 is another cross-sectional view of a bottom case, a bearing jig and an imaging apparatus in a fourth embodiment of this disclosure.
Figure 22:
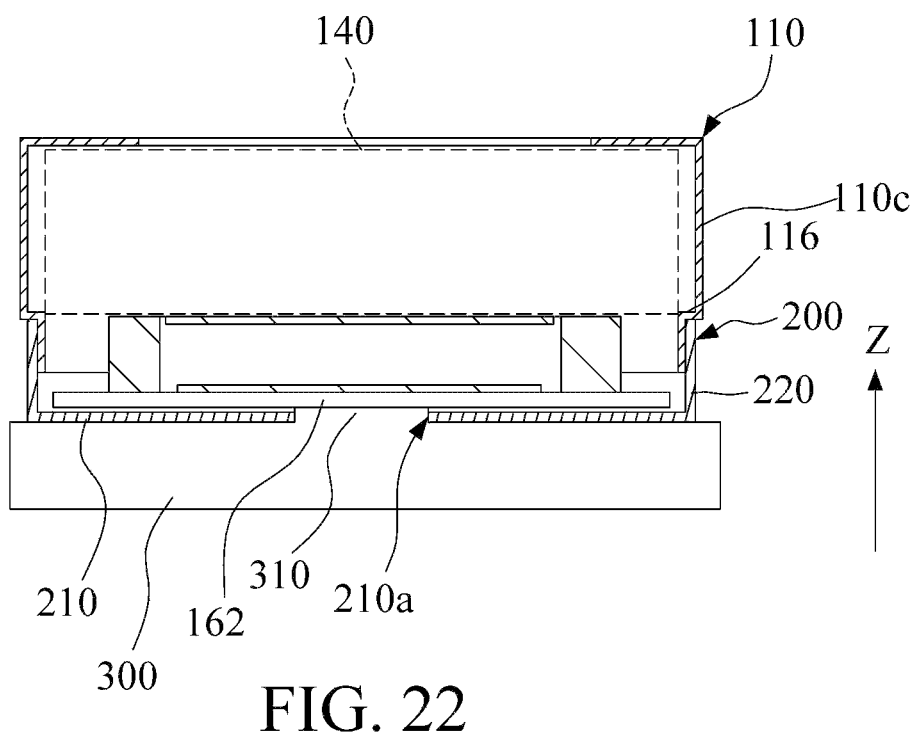
FIG. 22 is another cross-sectional view of the bottom case, the bearing jig and the imaging apparatus in the fourth embodiment of this disclosure.

As shown in FIG. 21 and FIG. 22, in some embodiments, the relative position of the positioning side wall 220 and the lateral side wall 110c of the fixing frame 110 is also interchangeable, that is, the positioning side wall 220 is sleeved on the lateral side wall 110c of the fixing frame 110 at the bottom surface side 110b. At this time, the outer side of the lateral side wall 110c of the fixing frame 110 is provided with a stop structure 116. After the lateral side wall 110c of the fixing frame 110 is sleeved by the positioning side wall 220, the positioning side wall 220 may be stopped by the stop structure 116.

Figure 23:
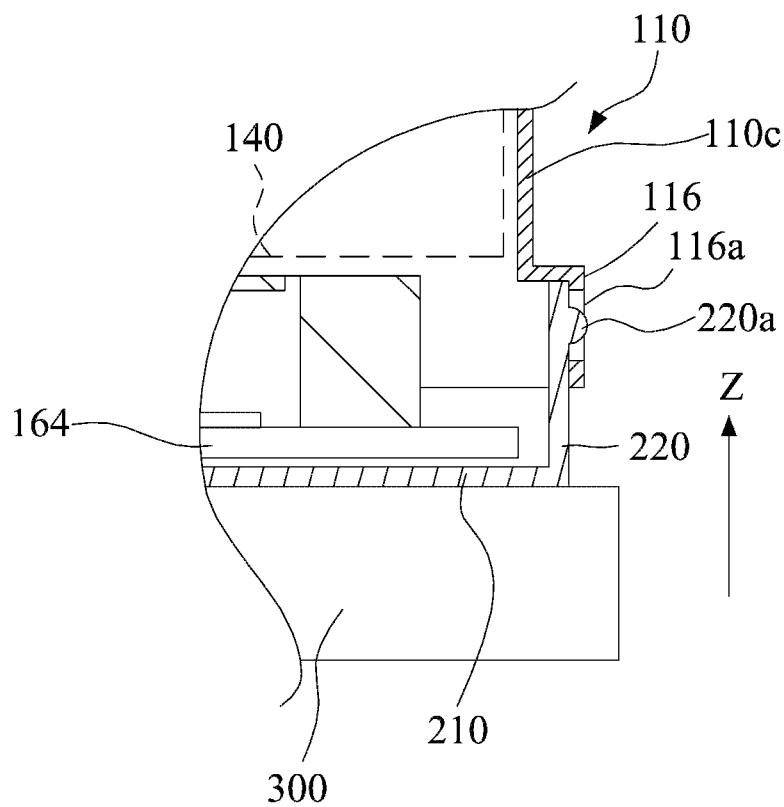
FIG. 23 is a partial cross-sectional view of the bottom case, the bearing jig and the imaging apparatus in the fourth embodiment of this disclosure.
Figure 24:
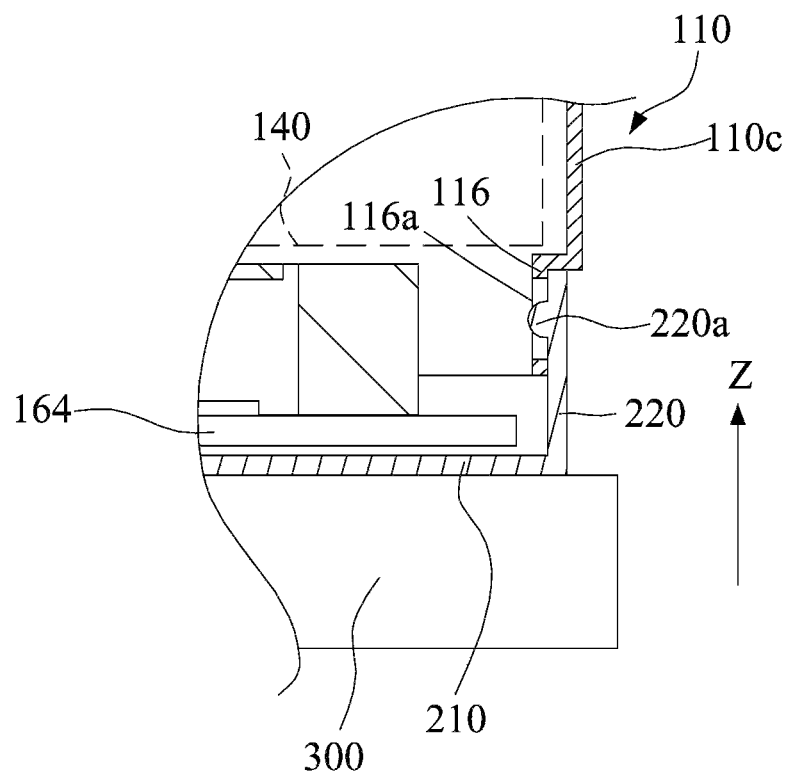
FIG. 24 is another partial cross-sectional view of the bottom case, the bearing jig and the imaging apparatus in the fourth embodiment of this disclosure.

In one embodiment, as shown in FIG. 23 and FIG. 24, a window 116a penetrates through the stop structure 116 of the fixing frame 110, and the positioning side wall 220 is provided with a bump 220a. The bump 220a extends to the window 116a. The width of the window 116a in an optical axis direction Z perpendicular to the image sensing chip 164 is greater than the width of the bump 220a in the optical axis direction Z, so the bump 220a may move within the width range of the window 116a. The positioning side wall 220 and the fixing frame 110 may be relatively moved in the optical axis direction Z to a limited extent through the cooperation of the bump 220a and the window 116a with each other. Correspondingly, the position of the image sensor assembly 160 in the optical axis direction Z may also be adjusted in the second stage by the bearing jig 300. After the adjustment, glue may also be applied and cured at the junction of the positioning side wall 220 and the fixing frame 110, so that the bottom case 200 may be adapted to replace the base 120 in one or more embodiments. In the present embodiment, the stop structure 116 is essentially an inter-embedded structure that allows the positioning side wall 220 and the fixing frame 110 to be fitted with each other and to perform a limited relative movement in the optical axis direction Z. In some embodiments, before assembly or adjustment of the positioning side wall 220 and the fixing frame 110, the junction between the positioning side wall 220 and the fixing frame 110 may also be coated with glue first, and the glue may be cured after the assembly or adjustment.

When the positioning side wall 220 is in contact with the stop structure 116, the height of the bearing board 210 relative to the bottom surface side 110b is smaller than the height of the fixing portion 114 relative to the bottom surface side 110b. Therefore, when the bottom case 200 is removed and the fixing portion 114 is fixed to the base 120, it is ensured that a spacing distance is maintained between the movable substrate 162 and the base 120. In some embodiments, the fixing portion 114 may not be fixed to the base 120 or the bottom case 200, but extends outward from one side of the fixing frame 110 to match the disposition of the flexible flat cable 130 and the flat signal cable 180 of an electronic device.

Figure 25:
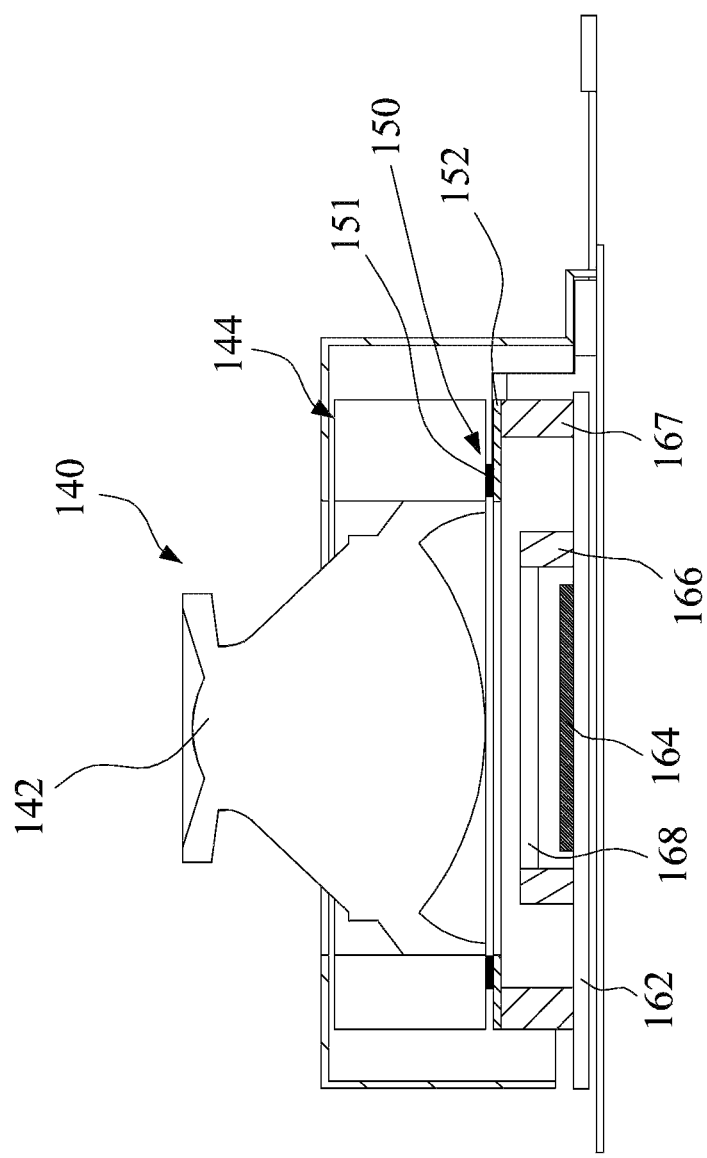
FIG. 25 is a cross-sectional view of an imaging apparatus in a fifth embodiment of this disclosure.

FIG. 25 shows an imaging apparatus 100 provided in a fifth embodiment of this disclosure and the imaging apparatus 100 further includes an auxiliary frame 167. In the assembly process, an auxiliary frame 167 may also be connected to the lower actuating member 152 of the optical image stabilization actuator 150, and the auxiliary frame 167 is then connected to the upper surface of the movable substrate 162.

Figure 26:
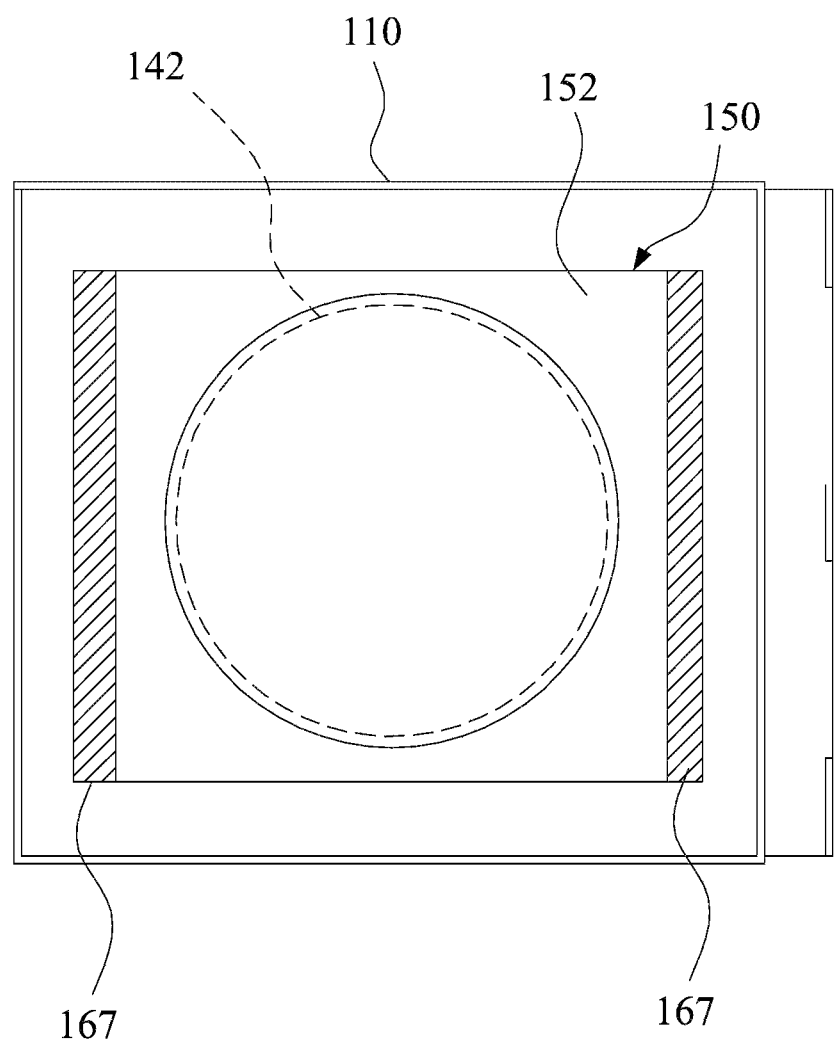
FIG. 26 is a bottom view of an optical lens set, a fixing frame and an optical image stabilization actuator in the fifth embodiment of this disclosure.
Figure 27:
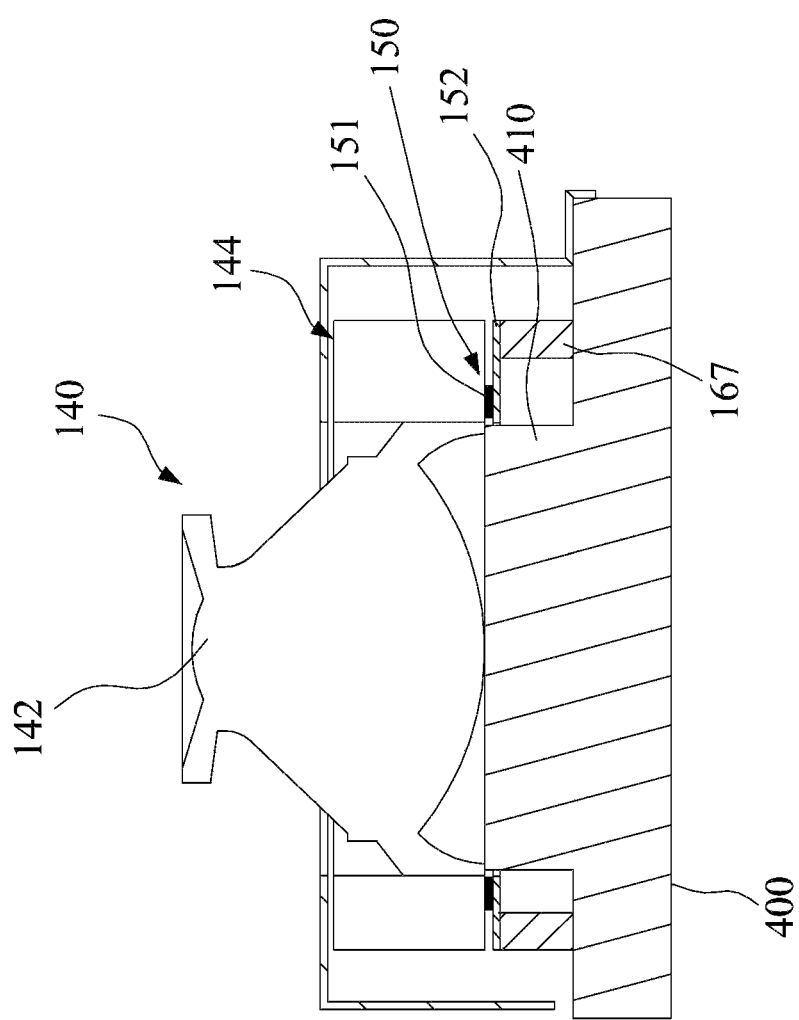
FIG. 27 is a bottom view of the fixing frame, a lens assembly, the optical image stabilization actuator and a lens bearing jig in the fifth embodiment of this disclosure.

As shown in FIG. 26 and FIG. 27, the hollow area of the optical image stabilization actuator 150 is enlarged, and the auxiliary frame 167 is used as the base of the focusing mechanism 144. The connection between the upper actuating member 151 and the lens assembly 140 moves outward to the outer edge of the focusing mechanism 144, so that a boss 410 of the lens bearing jig 400 is allowed to pass through the hollow area, and bear the optical lens set 142, thereby performing height increased assembly of the optical lens set 142 to ensure the relative position of the optical lens set 142 in the focusing mechanism 144.

As shown in FIG. 25 and FIG. 26, the bearing frame 166 and the optical glass plate 168 are configured to package the image sensing chip 164 to prevent dust, and the bearing frame 166 is smaller than the auxiliary frame 167 in size and is surrounded by the auxiliary frame 167. After the active alignment process is performed, the auxiliary frame 167 is fixed to the movable substrate 162 to complete the connection of the lens assembly 140, the optical image stabilization actuator 150 and the image sensor assembly 160. In the present embodiment, the bearing frame 166 is an independent frame fixed to the movable substrate 162, and may protect the image sensing chip 164 during assembly and alignment.

Figure 30:
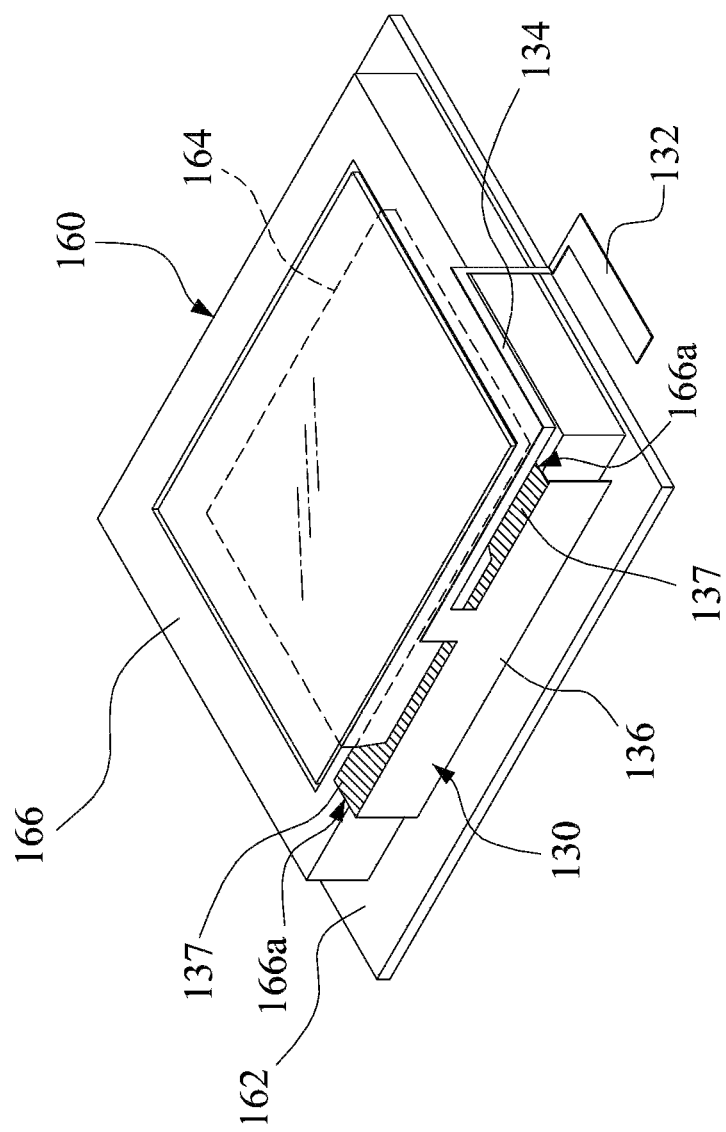
FIG. 30 is a perspective view of the flexible flat cable and the image sensor assembly in the sixth embodiment of this disclosure.

FIG. 28, FIG. 29 and FIG. 30 show a variation of the flexible flat cable 130 provided in a sixth embodiment of this disclosure. The flexible flat cable 130 may be first combined with the image sensor assembly 160 and electrically connected with the image sensing chip 164, and then the active alignment process is performed. In the sixth embodiment, the flexible flat cable 130 further includes one or more horizontal positioning pieces 137 extending from an upper edge of the electrical connection end 136. The top surface of the bearing frame 166 is further provided with one or more positioning notches 166a corresponding to the horizontal positioning pieces 137. In some embodiments, the electrical connection end 136 of the flexible flat cable 130 may be directly attached to the lateral wall of the bearing frame 166 without the disposition of the horizontal positioning pieces 137 and the positioning notches 166a.

As shown in FIG. 30, after the semi-finished product of the image sensor assembly 160 is completed, the electrical connection end 136 may be electrically connected to the movable substrate 162 first. At this time, the horizontal positioning piece 137 is embedded into the positioning notch 166a to assist in the vertical placement and positioning of the electrical connection end 136 of the flexible flat cable 130.

Based on the flexible flat cable 130 in the sixth embodiment, step S120 in FIG. 10 is corrected to embed the horizontal positioning piece 137 into the positioning notch 166a, so that the electrical connection end 136 is disposed perpendicular to the upper surface of the movable substrate 162 and contacts the electrical connection pads 162a of the movable substrate 162. When the flexible flat cable 130 of the sixth embodiment is applied, steps S110 and S120 need to be continuously completed to form a semi-finished product including the image sensor assembly 160 and the flexible flat cable 130, and then the lens assembly 140 or the fixing frame 110 is combined.

Figure 31:
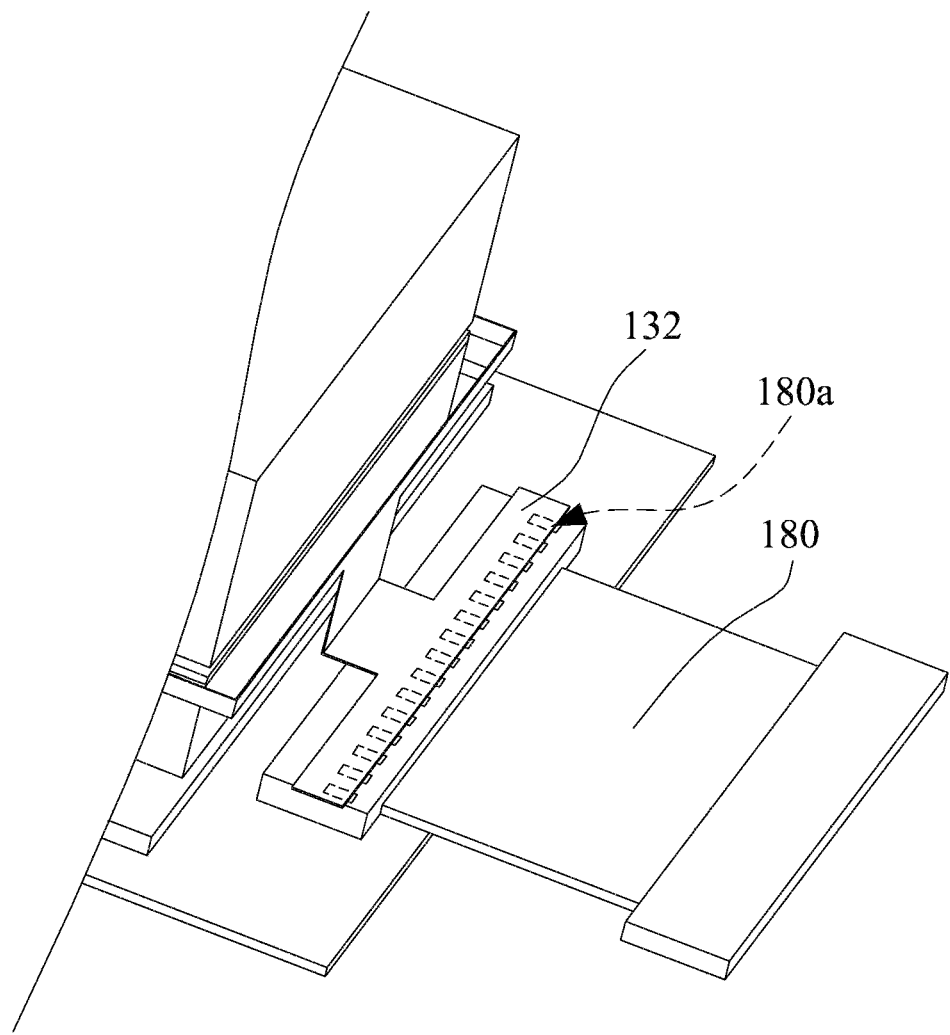
FIG. 31 is a perspective view of part of components of an imaging apparatus in a seventh embodiment of this disclosure.

FIG. 31 shows a variation of a flexible flat cable 130 provided in a seventh embodiment of this disclosure. In the previous embodiments, the fixed end 132 in FIG. 3 includes a two-piece structure divided into two rows, and the two-piece structure of the fixed end 132 is soldered or welded to two flat signal cables 180 respectively. In the present embodiment, as shown in FIG. 31, the fixed end 132 is a single-piece structure in a row, and the single-piece fixed end 132 may be soldered or welded to a single flat signal cable 180. In some embodiments, the fixed end 132 of the single-piece structure may be soldered or welded on the electrical connection pads 180a of the two flat signal cables 180. In some embodiments, the fixed end 132 of the two-piece structure may be soldered or welded on the electrical connection pads 180a of the single flat signal cable 180.

In some embodiments, the flexible flat cable 130 and the flat signal cable 180 may be integrated. For example, the fixed end 132 of the flexible flat cable 130 and the flat signal cable 180 in FIG. 31 are integrally formed. In other words, the fixed end 132 and the flat signal cable 180 do not need to be soldered or welded, and the flat signal cable 180 is directly integrally extended from the fixed end 132.

In one or more embodiments of this disclosure, the electrical connection end 136 is disposed perpendicular to the upper surface of the movable substrate 162 so as to be directly electrically connected (such as soldered or welded) to the circuit of the movable substrate 162. The electrical connection end 136 does not need to be bent into a state parallel to the upper surface of the movable substrate 162. Therefore, the process of installing the flexible flat cable 130 may avoid contacting other components. In one or more embodiments, the flexible flat cable 130 is combined with the fixing frame 110 or a bearing frame 166 of the image sensor assembly 160 in advance to facilitate installation of the flexible flat cable 130. In one or more embodiments of this disclosure, a plurality of signal feed-in contacts 170 are further disposed on the movable substrate 162 of the image sensor assembly 160, thereby facilitating lighting up of the image sensing chip 162 in the assembly process, and facilitating an active alignment process.

What is claimed is:

1. An imaging apparatus comprising:
    an image sensor assembly, comprising a movable substrate, an image sensing chip, a bearing frame, and a signal feed-in part extending from an edge of the movable substrate, wherein the image sensing chip is disposed on an upper surface of the movable substrate, and the bearing frame is disposed on the upper surface of the movable substrate and surrounds the image sensing chip;
    a plurality of signal feed-in contacts, disposed on the signal feed-in part, wherein vertical projections of the signal feed-in contacts disposed on the signal feed-in part and the bear frame do not overlap, and the signal feed-in contacts are configured to transmit an enabling signal for enabling image sensing chip,
    a lens assembly and a fixing frame, wherein the fixing frame comprises a top surface side, a bottom surface side and a lateral side wall; the top surface side and the bottom surface side are communicated to form an accommodating space, the lateral side wall connects the top surface side and the bottom surface side and surrounds the accommodating space, the lens assembly is disposed in the accommodating space and fixed to the fixing frame, the upper surface of the movable substrate faces the bottom surface side, the image sensor assembly passes through the bottom surface side and is connected to the lens assembly, and the upper surface of the movable substrate is provided with a plurality of electrical connection pads; and
    at least one flexible flat cable, comprising a fixed end and an electrical connection end, wherein the fixed end is located outside the fixing frame; the electrical connection end protrudes from the bottom surface side, and a plurality of terminals on an edge of the electrical connection end are electrically connected to the plurality of electrical connection pads of the movable substrate.

2. The imaging apparatus according to claim 1, further comprising another signal feed-in contacts disposed on the upper surface, a lower surface, or an edge of the movable substrate.

3. The imaging apparatus according to claim 1, further comprising a fixing portion and a base, wherein the fixing portion is disposed on the fixing frame and fixed to the base, so that a spacing distance is formed between the bottom surface side and the base, and the fixed end is fixed to the fixing portion.

4. The imaging apparatus according to claim 1, further comprising an optical image stabilization actuator, wherein the optical image stabilization actuator comprises an upper actuating member and a lower actuating member; the upper actuating member is connected to the lens assembly, the image sensor assembly is connected to the lower actuating member, and the lower actuating member is configured to be moved with respect to the upper actuating member.

5. The imaging apparatus according to claim 4, further comprising an auxiliary frame, connected to the lower actuating member and the upper surface of the movable substrate, and surrounding the bearing frame of the image sensor assembly.

6. A method for assembling an imaging apparatus, comprising:
    providing an image sensor assembly; wherein the image sensor assembly comprises a movable substrate, an image sensing chip, a bearing frame and a signal feed-in part extending from an edge of the movable substrate, the image sensing chip is disposed on an upper surface of the movable substrate, and the bearing frame is disposed on the upper surface of the movable substrate and surrounds the image sensing chip;

disposing a plurality of signal feed-in contacts on the signal feed-in part; wherein vertical projections of the signal feed-in contacts disposed on the signal feed-in part and the bearing frame do not overlap, and the signal feed-in contacts are configured to transmit an enabling signal for enabling the image sensing chip;

disposing a lens assembly above an image sensor assembly;

before connecting the image sensor assembly to the lens assembly, transmitting the enabling signal to the image sensing chip to light up the image sensing chip;

according to at least one test image generated by the image sensing chip, adjusting a relative position between the lens assembly, an optical axis of the lens assembly, and the image sensing chip, to correct the optical axis; and connecting the image sensor assembly to the lens assembly.

7. The method for assembling the imaging apparatus according to claim 6, further comprising removing the signal feed-in part after correcting the optical axis and connecting the image sensor assembly to the lens assembly.

8. The method for assembling the imaging apparatus according to claim 6, further comprising:

providing a fixing frame; wherein the fixing frame comprises a top surface side, a bottom surface side and a lateral side wall; the top surface side and the bottom surface side are communicated to form an accommodating space, and the lateral side wall connects the top surface side and the bottom surface side and surrounds the accommodating space;

fixing the lens assembly in the accommodating space of the fixing frame;

providing a bottom case; wherein the bottom case includes a bearing board and a positioning side wall surrounding the bearing board;

placing the image sensor assembly on the bearing board;

after correcting the optical axis moving the bearing board and the image sensor assembly toward the bottom surface side of the fixing frame; and having the positioning side wall and the lateral side wall of the fixing frame sleeved with each other on the bottom surface side, to connect the lens assembly to the image sensor assembly.

9. The method for assembling the imaging apparatus according to claim 8, further comprising:

providing a bear jig for the bottom case being placed on the bearing jig; wherein a bearing board is provided with a hole, the movable substrate covers the hole, and the bearing jig is provided with a bearing convex part passing the hole; and lifting the movable substrate by using the bearing convex part, to maintain a predetermined distance between the image sensor assembly and the bearing board.

10. The method for assembling the imaging apparatus according to claim 9, wherein an inner side surface or an outer side surface of the lateral side wall is provided with a stop structure, and after the positioning side wall and the lateral side wall are sleeved with each other, the positioning side wall is stopped by the stop structure.

11. The method for assembling the imaging apparatus according to claim 10, wherein the stop structure of the fixing frame is provided with a window penetrating thereof, and the positioning side wall is provided with a bump extending to the window.

12. The method for assembling the imaging apparatus according to claim 6, wherein the step for connecting the image sensor assembly to the lens assembly including:

connecting an optical image stabilization actuator to the lens assembly; and connecting the optical image stabilization actuator to the bearing frame.

13. The method for assembling the imaging apparatus according to claim 6, wherein the step for connecting the image sensor assembly to the lens assembly including:

connecting an optical image stabilization actuator to the lens assembly;

connecting an auxiliary frame to the optical image stabilization actuator; and connecting the auxiliary frame to the upper surface of the movable substrate.

* * * * *